(12) United States Patent
Sakanashi et al.

(10) Patent No.: US 10,725,832 B2
(45) Date of Patent: Jul. 28, 2020

(54) INFORMATION PROCESSING SYSTEM, INFORMATION PROCESSING APPARATUS, METHOD FOR PROCESSING INFORMATION, AND INFORMATION PROCESSING PROGRAM

(71) Applicants: Ryutaro Sakanashi, Kanagawa (JP); Yuuichiroh Hayashi, Kanagawa (JP)

(72) Inventors: Ryutaro Sakanashi, Kanagawa (JP); Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 15/760,371

(22) PCT Filed: Oct. 25, 2016

(86) PCT No.: PCT/JP2016/004687
§ 371 (c)(1),
(2) Date: Mar. 15, 2018

(87) PCT Pub. No.: WO2017/073049
PCT Pub. Date: May 4, 2017

(65) Prior Publication Data
US 2018/0285163 A1    Oct. 4, 2018

(30) Foreign Application Priority Data

Oct. 30, 2015  (JP) ................................. 2015-214039
Jul. 27, 2016  (JP) ................................. 2016-147245

(51) Int. Cl.
*G06F 9/50*     (2006.01)
*G06Q 10/10*    (2012.01)
(Continued)

(52) U.S. Cl.
CPC .............. *G06F 9/5061* (2013.01); *G06F 9/48* (2013.01); *G06F 9/54* (2013.01); *G06Q 10/10* (2013.01); *H04L 67/1097* (2013.01); *H04L 67/02* (2013.01)

(58) Field of Classification Search
CPC ........... G06F 9/48; G06F 9/54; G06F 9/5061; G06Q 10/10; H04L 67/1097; H04L 67/02
See application file for complete search history.

(56) References Cited

U.S. PATENT DOCUMENTS 9,436,523 B1 *  9/2016  Gibson .................. G06F 9/547
2003/0041142 A1  2/2003  Zhang et al.
(Continued)

FOREIGN PATENT DOCUMENTS

JP   2000-066980   3/2000
JP   2003-067207   3/2003
(Continued)

OTHER PUBLICATIONS

Extended European Search Report for 16859287.1 dated Jul. 6, 2018.
(Continued)

*Primary Examiner* — Azizul Choudhury
(74) *Attorney, Agent, or Firm* — IPUSA, PLLC

(57) ABSTRACT

An information processing system includes programs so as to implement a memory unit storing, for each application executing a sequence of processes using electronic data, program identification information of identifying at least one program executing the sequence of processes, a parameter used to execute each program, and flow information defining an execution order of the at least one program while associating app identification information with the program identification information, the parameter, and the flow information, an acquiring unit acquiring the flow information;
(Continued)

and an executing unit causing each program identified by the program identification information to execute the sequence of processes, the executing unit replacing, when a data value of a data item included in the parameter used to execute the program is designated to be replaced by another data value, the data value with the other data value.

9 Claims, 26 Drawing Sheets

(51) Int. Cl.
    *G06F 9/48*     (2006.01)
    *G06F 9/54*     (2006.01)
    *H04L 29/08*     (2006.01)

(56) References Cited

U.S. PATENT DOCUMENTS

| | | | |
|---|---|---|---|
| 2006/0229923 A1* | 10/2006 | Adi | G06Q 10/06 705/7.27 |
| 2007/0180493 A1* | 8/2007 | Croft | G06F 3/1415 726/2 |
| 2010/0198768 A1* | 8/2010 | Zhou | G06F 9/453 706/47 |
| 2012/0197686 A1* | 8/2012 | Abu El Ata | G06Q 10/06 705/7.39 |
| 2012/0254870 A1 | 10/2012 | Sato | |
| 2013/0297668 A1 | 11/2013 | McGrath et al. | |
| 2014/0074973 A1 | 3/2014 | Kumar et al. | |
| 2015/0082320 A1 | 3/2015 | Hori et al. | |
| 2016/0241724 A1 | 8/2016 | Sugimura et al. | |

FOREIGN PATENT DOCUMENTS

| | | |
|---|---|---|
| JP | 2003-157242 | 5/2003 |
| JP | 5112085 | 1/2013 |
| JP | 2014-127066 | 7/2014 |
| JP | 2016-154000 | 8/2016 |

OTHER PUBLICATIONS

International Search Report dated Jan. 24, 2017 in PCT/JP2016/004687 filed on Oct. 25, 2016.

* cited by examiner

[Fig. 1]
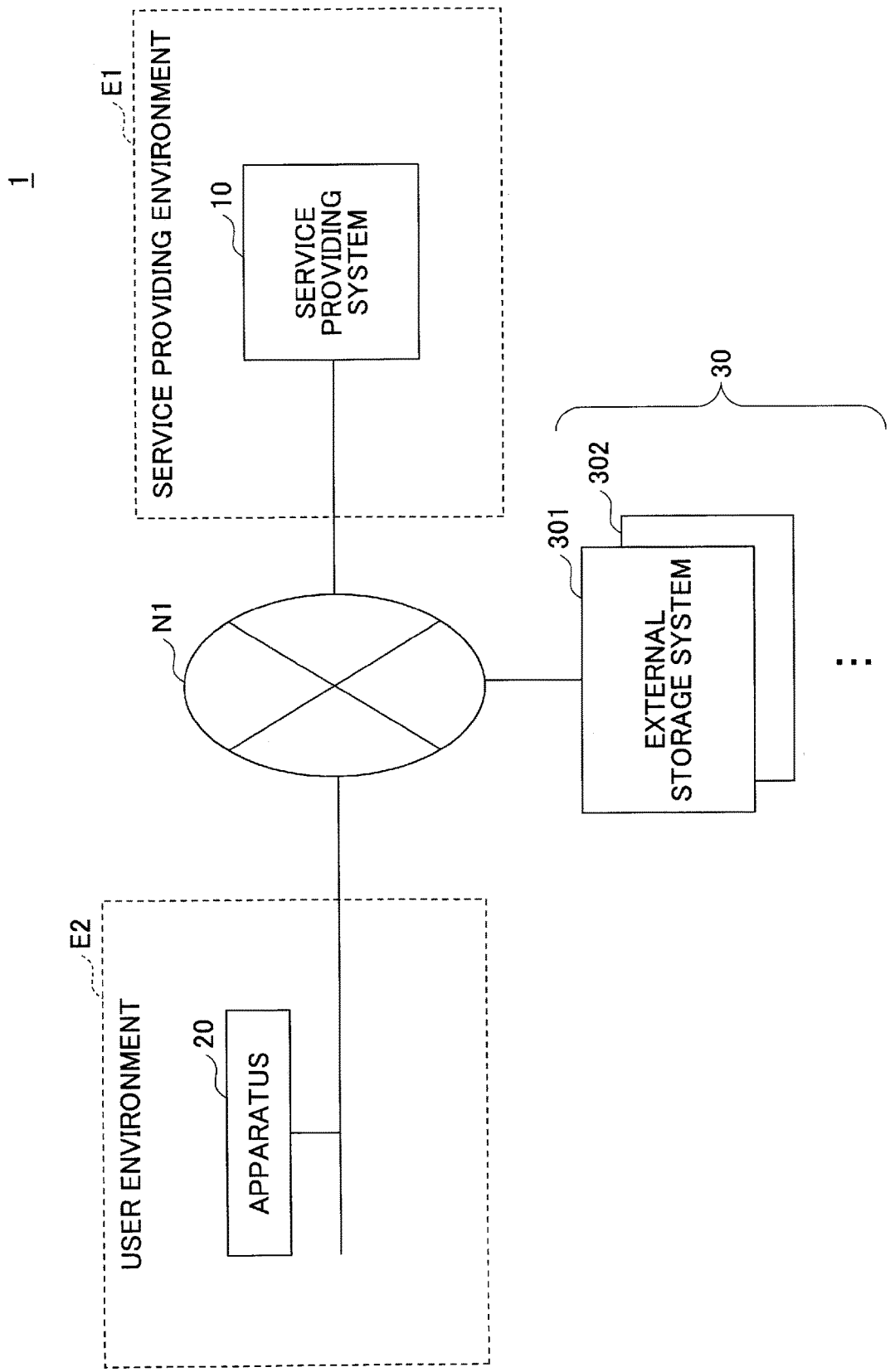

[Fig. 2]
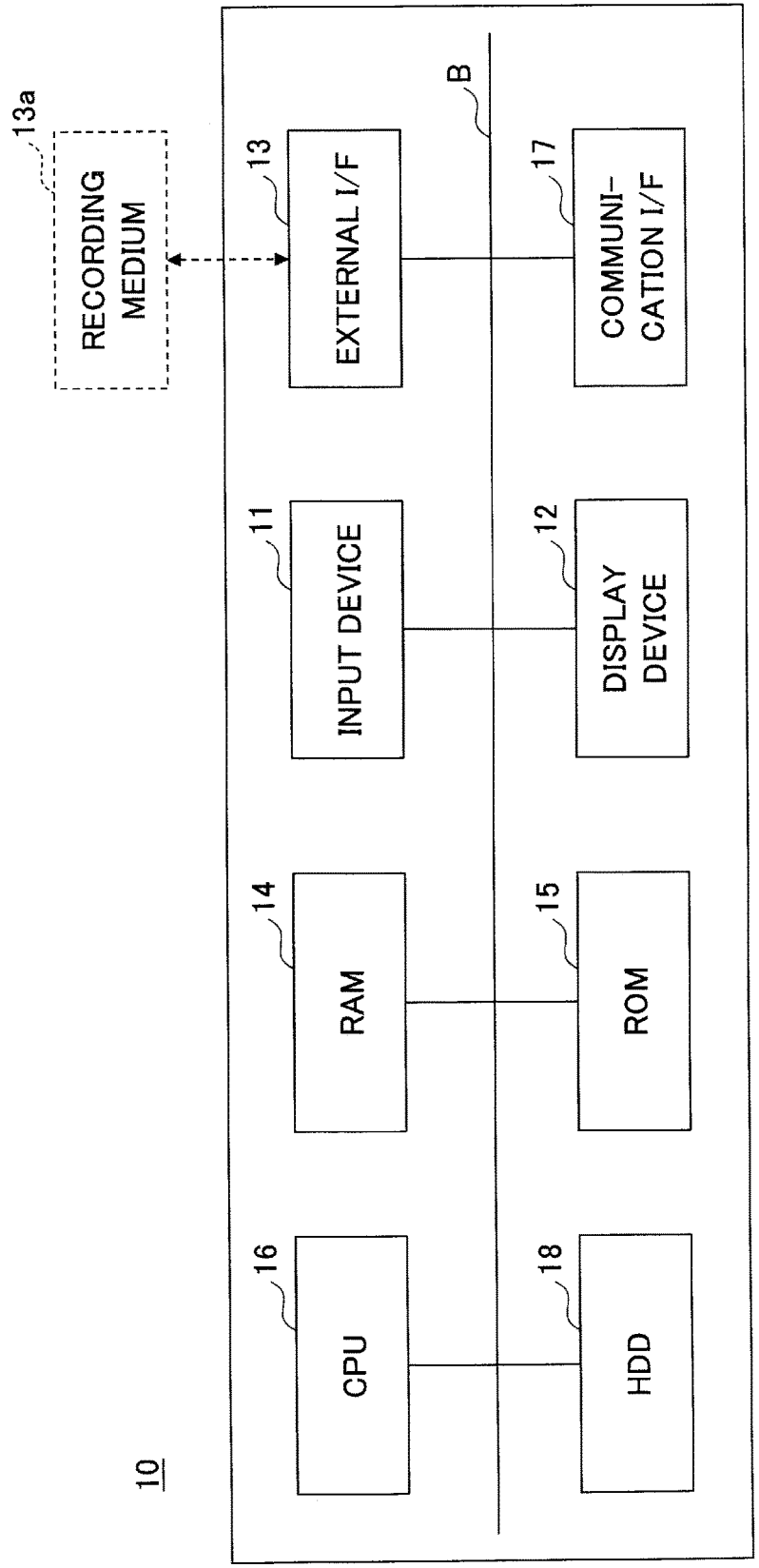

[Fig. 3]
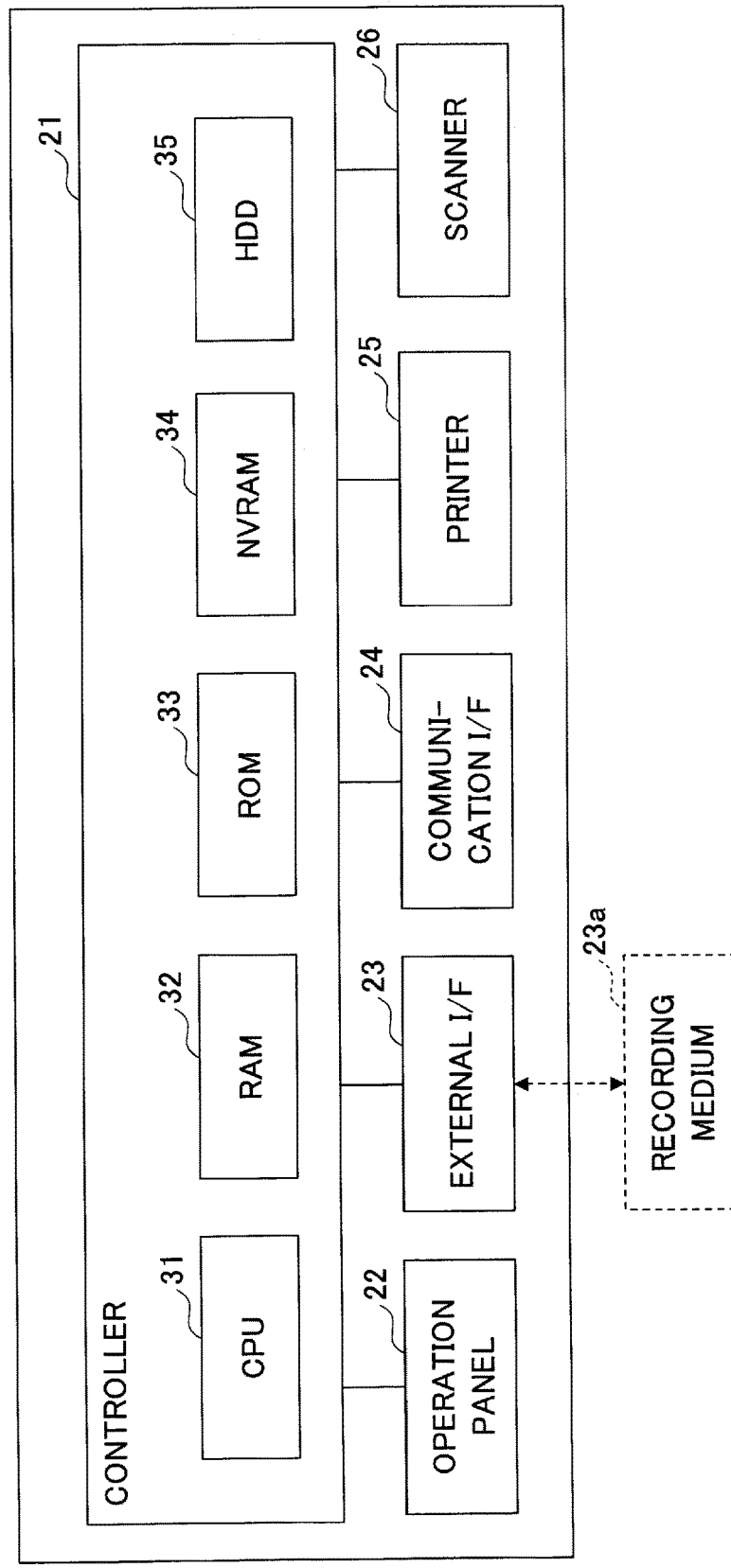

[Fig. 4]
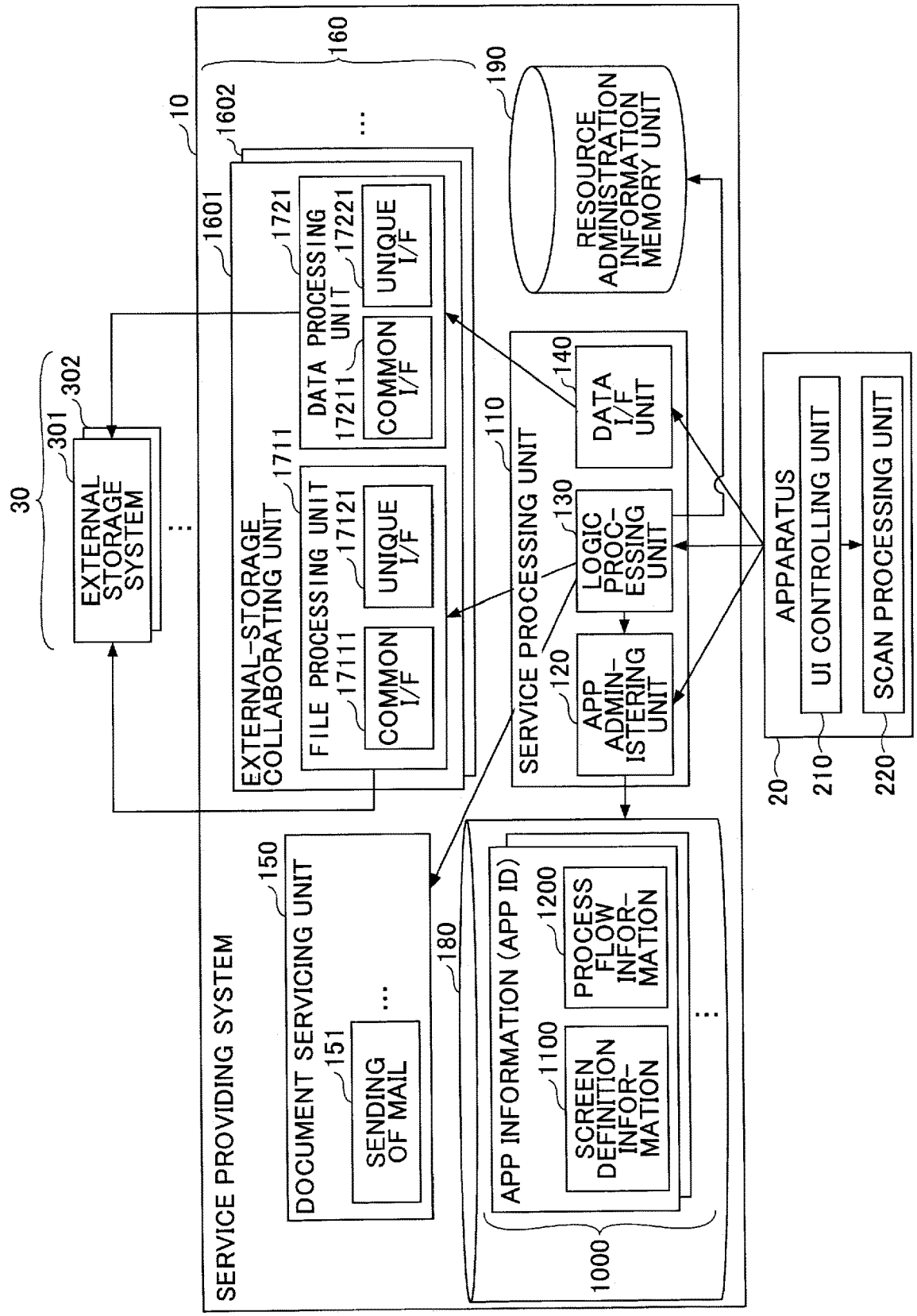

[Fig. 5A]

| COMMON I/F OF FILE PROCESSING UNIT | |
|---|---|
| COMMON I/F | SUMMARY |
| /EXTERNAL STORAGE NAME/process/file | ACQUIRING FILE FROM DESIGNATED STORAGE SERVICE |
| /EXTERNAL STORAGE NAME/process/folder | STORING FILE IN DESIGNATED STORAGE SERVICE |
| ... | ... |

[Fig. 5B]

| UNIQUE I/F OF FILE PROCESSING UNIT | |
|---|---|
| UNIQUE I/F | SUMMARY |
| /EXTERNAL STORAGE NAME<br>/process/extension/attach | ADDING FILE TO DOCUMENT STORED IN DESIGNATED STORAGE SERVICE |
| ... | ... |

[Fig. 5C]

| COMMON I/F OF DATA PROCESSING UNIT | |
|---|---|
| COMMON I/F | SUMMARY |
| /EXTERNAL STORAGE NAME/data/files | ACQUIRING FILE VIEW FROM DESIGNATED STORAGE SERVICE |
| /EXTERNAL STORAGE NAME/data/folders | ACQUIRING FOLDER VIEW FROM DESIGNATED STORAGE SERVICE |
| ... | ... |

[Fig. 5D]

| UNIQUE I/F OF DATA PROCESSING UNIT | |
|---|---|
| UNIQUE I/F | SUMMARY |
| /EXTERNAL STORAGE NAME /data/extension/images | ACQUIRING IMAGE FILE VIEW FROM DESIGNATED STORAGE SERVICE |
| ... | ... |

[Fig. 6]
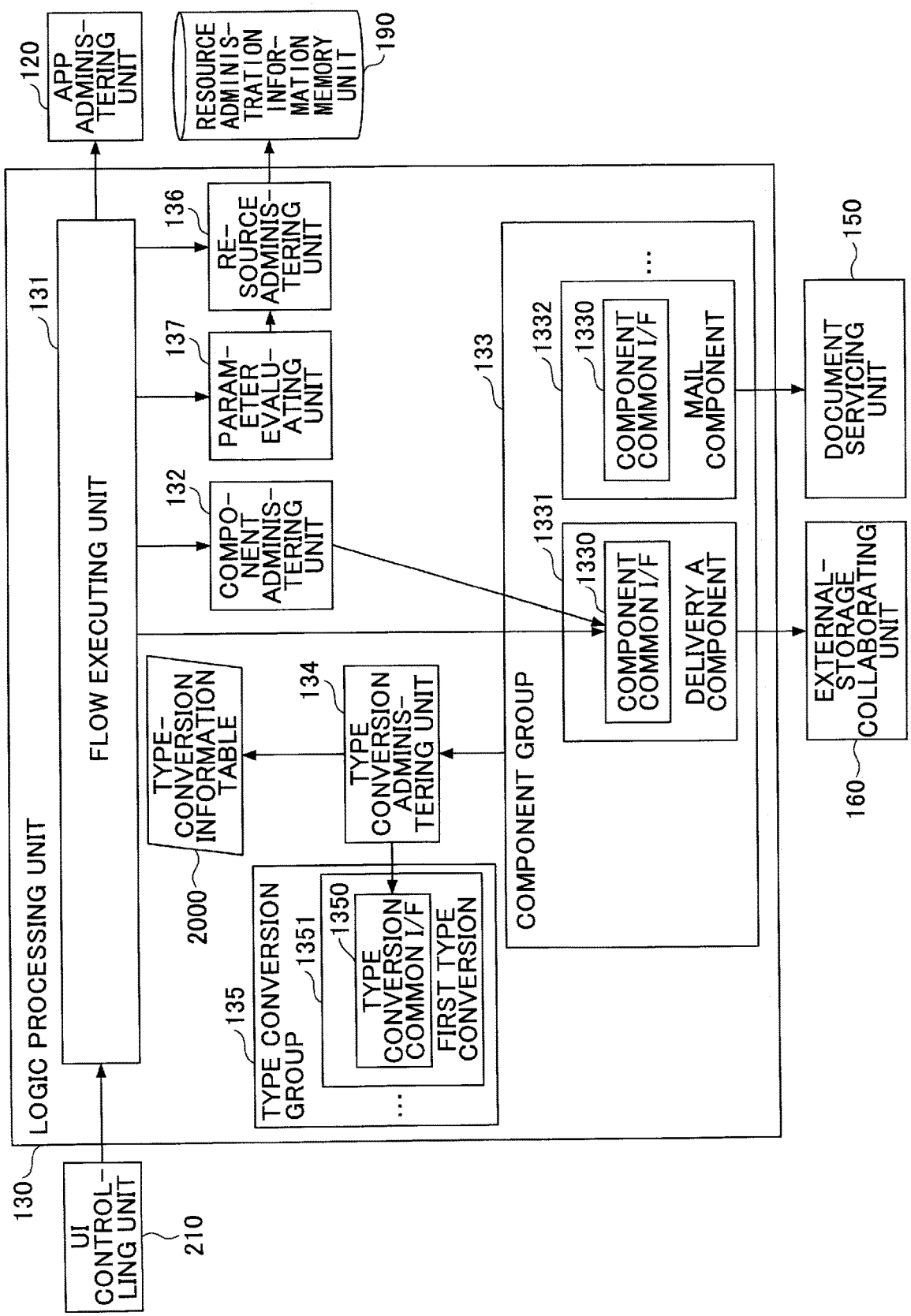

[Fig. 7]

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

```
{                                                           ~1200
    "flowId" : "flow001" ,  }~1201
    "flowName" : "scan delivery 1" , }~1202        ~1203
    "flowDetails" : [
        {
            "component" : "delivery A component" ,
            "parameters" : {
                "filename" : null ,                    ~1204
                "folder" : null
            }
        },                                             ~1205
        {
            "component" : "mail component" ,
            "parameters" : {
                "from" : "hoge@fuga.com",
                "to" : null ,
                "cc" : null ,
                "bcc" : null ,
                "subject" : "report of storage destination URL",
                "body" : "$ { delivery A component.result.fileurl } "
            }
        {
    ]
}
```

[Fig. 9]
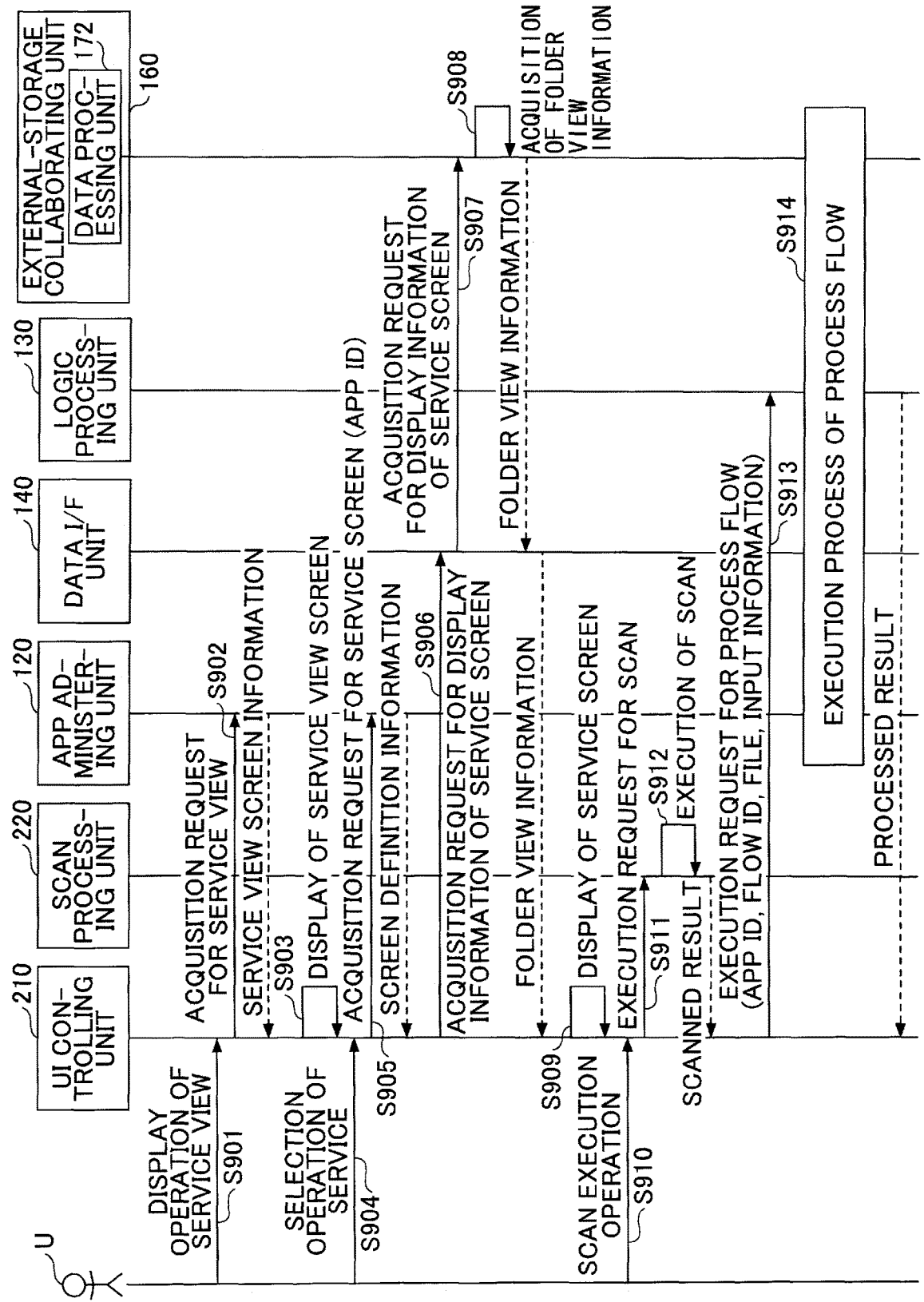

[Fig. 10]
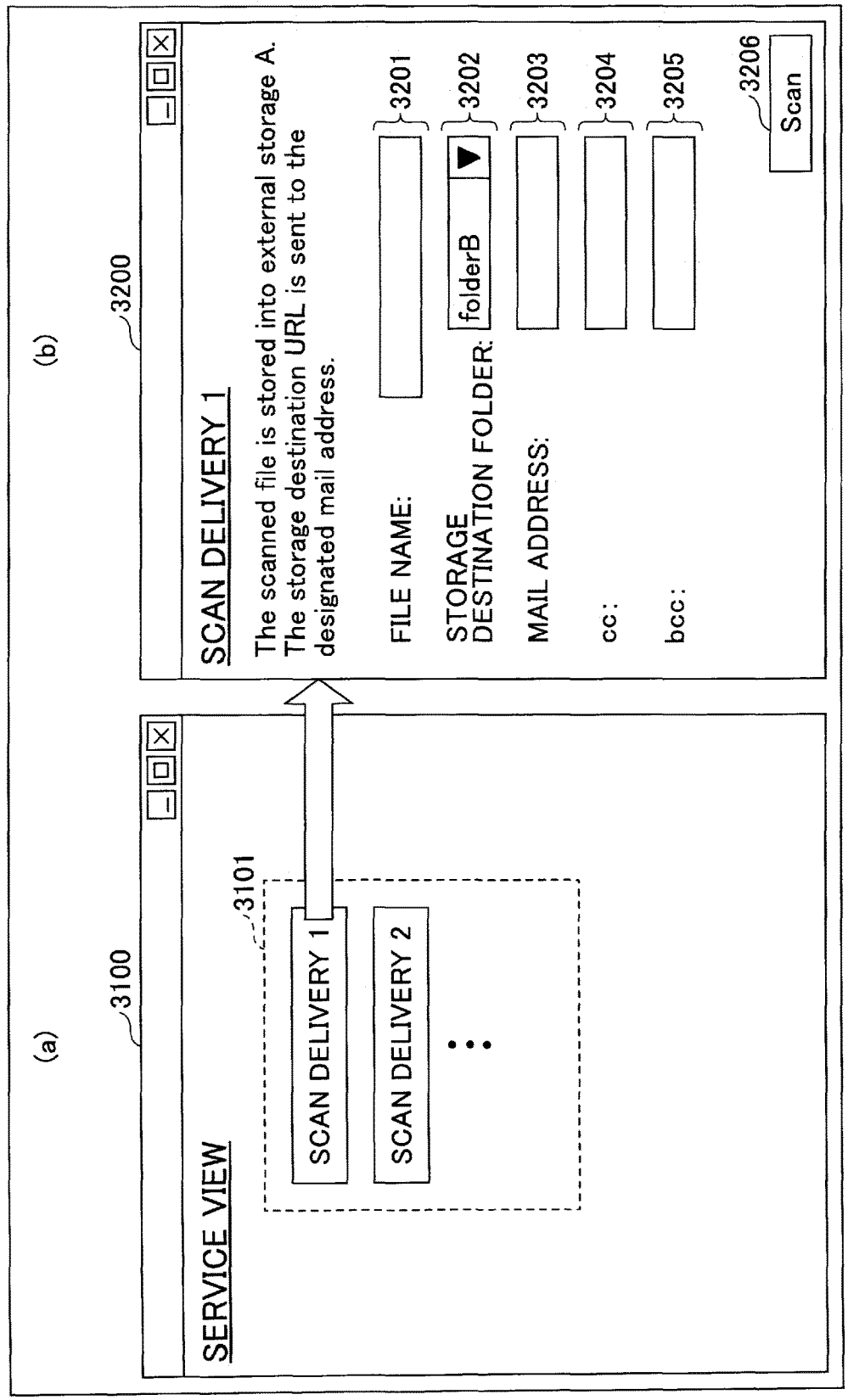

[Fig. 11]
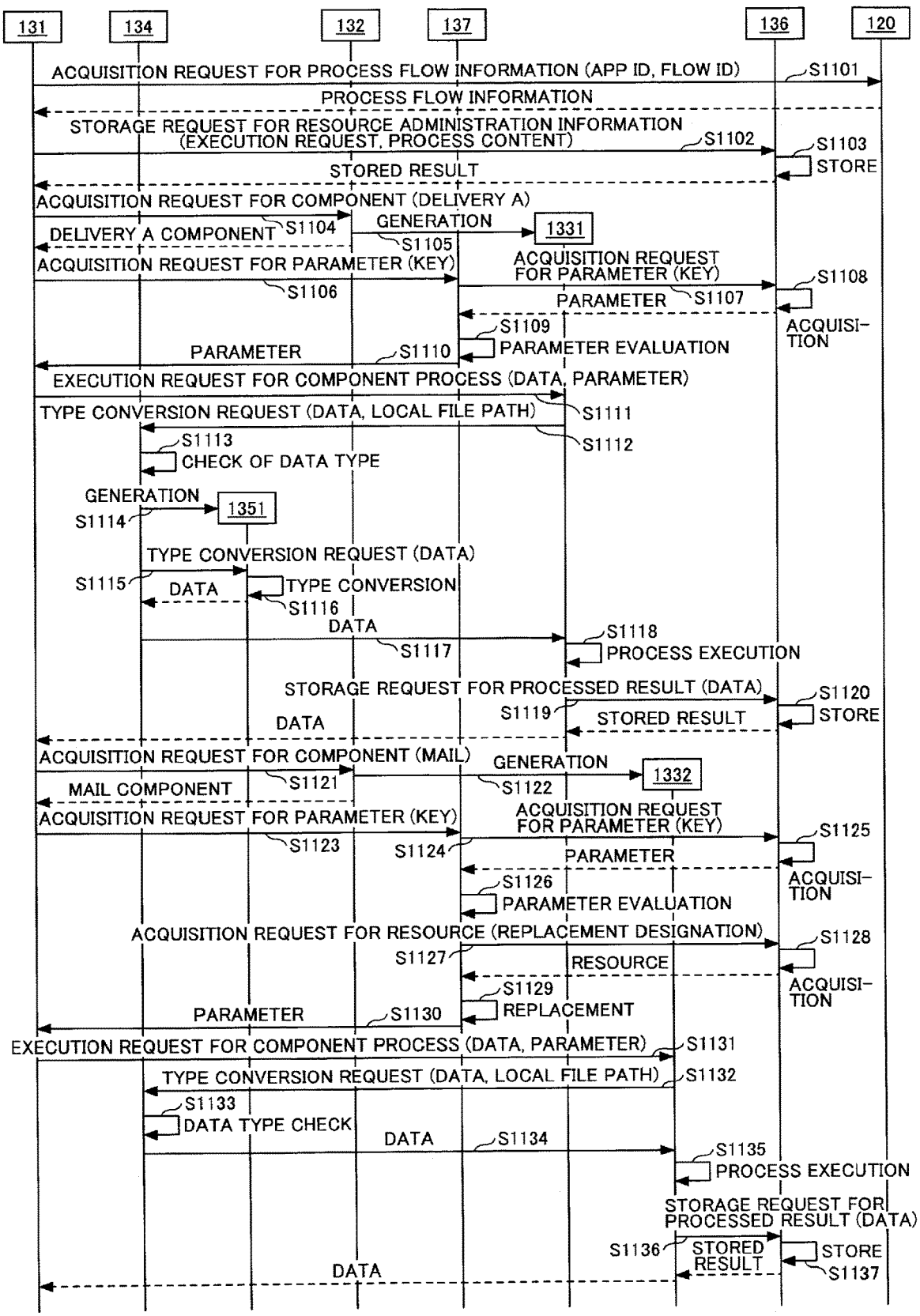

[Fig. 12A]

```
{                                                              190D
    "http" : {
        "header" : {
            ...
        },                          ⎫
                                    ⎬ 191
        "body" : {                  ⎭
            "data" : " ... ",
            ...
        }
    },                                                         192
    "parameters" : {
        "delivery A component" : {  ⎫
            "filename" : "file1",   ⎬ 1921
            "folder" : "folderB"    ⎭
        },
        "mail component" : {
            "from" : "hoge@fuga.com",
            "to" : "hogehoge@fuga.com",
            "cc" : null,                                       ⎫
            "bcc" : null,                                      ⎬ 1922
            "subject" : "report of storage destination URL",   ⎭
            "body" : " ${ delivery A component.result.fileurl } "
        }
    },
    "result" : {  ⎫
                  ⎬ 193
    }             ⎭
}
```

[Fig. 12B]

```
{
  "http" : {
     (snip)
  },
  "parameters" : {
     (snip)
  },
  "result" : {
     "delivery A component" : {
        "filename" : "file1",
        "fileurl" : "http://storageA.com/folderB/file1.txt"
     },
     "mail component" : {
        "from" : "hoge@fuga.com",
        "to" : "hogehoge@fuga.com",
        "cc" : null,
        "bcc" : null,
        "subject" : "report of storage destination URL",
        "body" : "http://storageA.com/folderB/file1.txt"
     }
  }
}
```

- 190D
- 193
- 1931 (delivery A component block)
- 1932 (mail component block)

[Fig. 13A]

```
                                                        4100
"parameters" : {
    "filename" : "file1" ,
    "folder" : "folderB"
}
```

[Fig. 13B]

```
                                                            4200
"parameters" : {
    "from" : "hoge@fuga.com",
    "to" : "hogehoge@fuga.com",
    "cc" : null,
    "bcc" : null,
    "subject" : "report of storage destination URL",
    "body" : "http://storageA.com/folderB/file1.txt
}
```

[Fig. 14]

```
{                                           190D
    "http" : {
            (snip)
    },
    "parameters" : {
            (snip)
    },
    "result" : {
        "delivery A component" : {
            "errors" : "invalid_input" ,    1933
        }
    }
}
```

[Fig. 15]
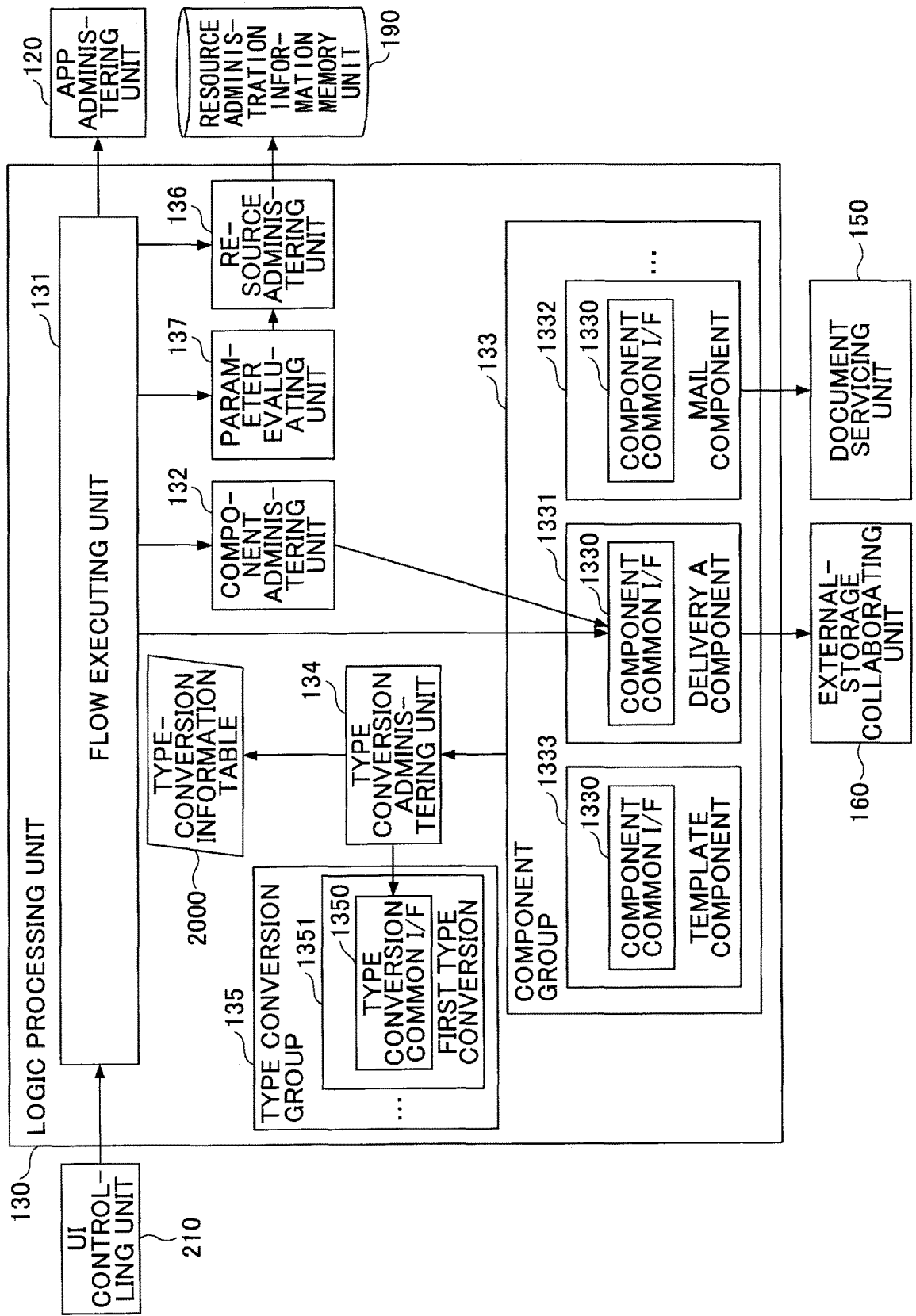

[Fig. 16]
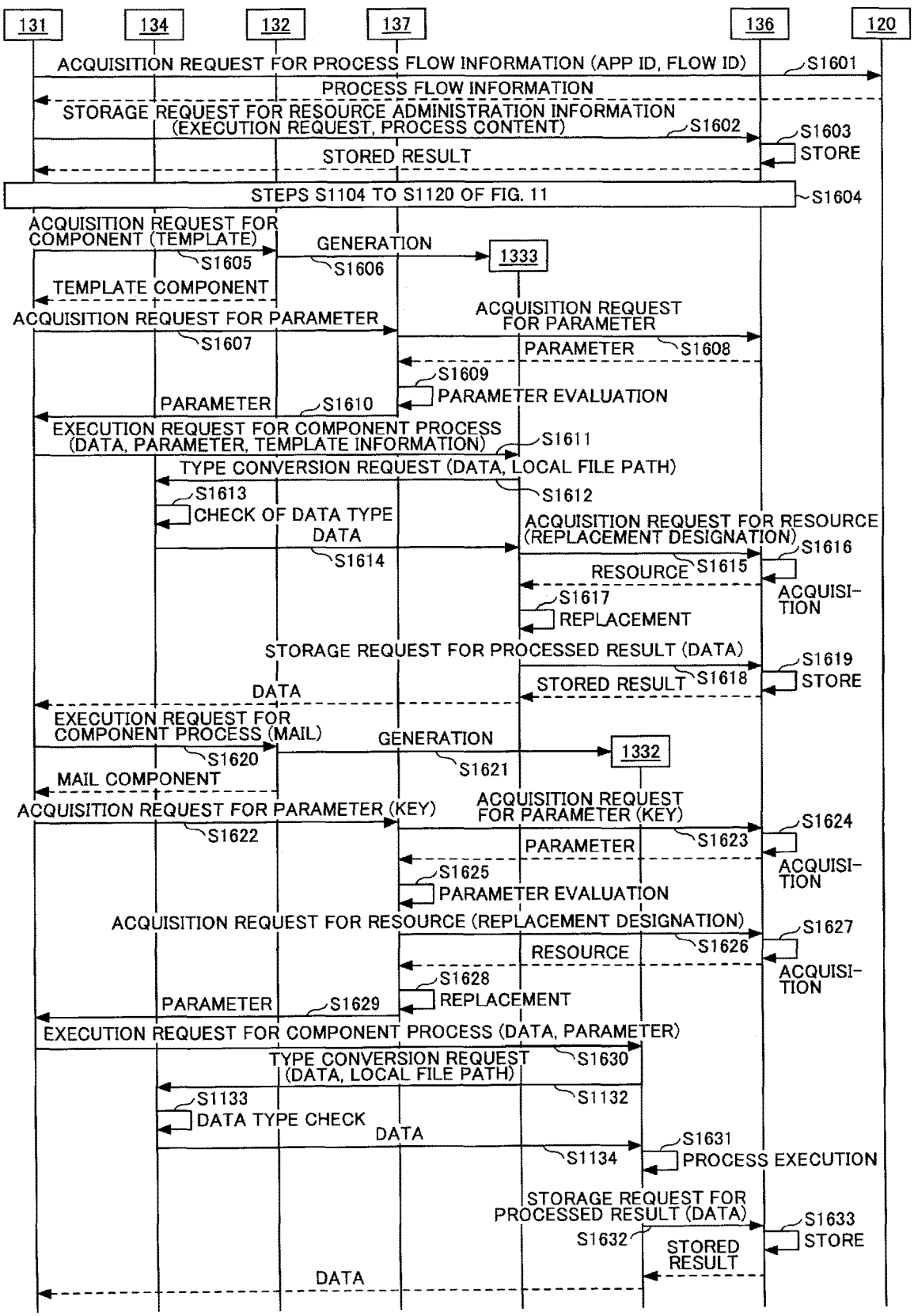

[Fig. 17]

```
{                                              /1200
    "flowId" : "flow002" ,         }-1211
    "flowName" : "scan delivery 2" , }-1212        /1213
    "flowDetails" : [
    ┌─────────────────────────────────────────────────┐
    │   {                                             │
    │       "component" : "delivery A component" ,    │
    │       "parameters" : {                          │
    │           "filename" : " " ,           ~-1214   │
    │           "folder" : " "                        │
    │       }                                         │
    │   },                                            │
    └─────────────────────────────────────────/1215───┘
    ┌─────────────────────────────────────────────────┐
    │   {                                             │
    │       "component" : "template component" ,      │
    │       "parameters" : {                          │
    │       },                                        │
    │       "template" : "The file is stored into external storage A. │
    │                The storage destination URL is ${ delivery component.result.fileurl }." │
    │   },                                            │
    └─────────────────────────────────────────────────┘
    ┌─────────────────────────────────────────────────┐
    │   {                                             │
    │       "component" : "mail component" ,          │
    │       "parameters" : {                          │
    │           "from" : "hoge@fuga.com",             │
    │           "to" : " " ,                          │
    │           "cc" : " " ,                 ~-1216   │
    │           "bcc" : " " ,                         │
    │           "subject" : "report of storage destination URL", │
    │           "body" : "${ template component.result.template } " │
    │       }                                         │
    └─────────────────────────────────────────────────┘
    ]
}
```

[Fig. 18A]

```
{
    "http" : {                                              ⎫
        "header" : {                                        ⎪
            ...                                             ⎬ 194
        },                                                  ⎪
        "body" : {                                          ⎪
            "data" : " ... ",                               ⎪
            ...                                             ⎪
        }                                                   ⎭
    },                                                              ⌐ ─ ─ 195
    "parameters" : {
        "delivery A component" : {      ⎫
            "filename" : "file1",       ⎬ 1951
            "folder" : "folderB"        ⎭
        },
        "template component" : {        ⎫
        },                              ⎬ 1952
        "mail component" : {
            "from" : "hoge@fuga.com",                                       ⎫
            "to" : "hogehoge@fuga.com",                                     ⎪
            "cc" : null,                                                    ⎪
            "bcc" : null,                                                   ⎬ 1953
            "subject" : "report of storage destination URL",                ⎪
            "body" : " ${ template component.result.template } "            ⎭
        }
    },
    "result" : {    ⎫
    }               ⎬ 196
}
```

```
{
  "http" : {
    (snip)
  },
  "parameters" : {
    (snip)
  },                                                                    /–196
  "result" : {
    "delivery A component" : {
      "filename" : "file1",                        ⎫
      "fileurl" : "http://storageA.com/folderB/file1.txt"  ⎬ 1961
    },                                             ⎭
    "template component" : {
      "template" : "The file is stored into the external storage A.   ⎫
                    The storage destination URL is                    ⎬ 1962
                    http://storageA.com/folderB/file1.txt."           ⎭
    },
    "mail component" : {
      "from" : "hoge@fuga.com",
      "to" : "hogehoge@fuga.com",
      "cc" : null,
      "bcc" : null,                                                    ⎫
      "subject" : "report of storage destination URL",                 ⎬ 1963
      "body" : "The file is stored into the external storage A.
                The storage destination URL is
                http://storageA.com/folderB/file1.txt."
    }
  }
}
```

190D

[Fig. 19A]
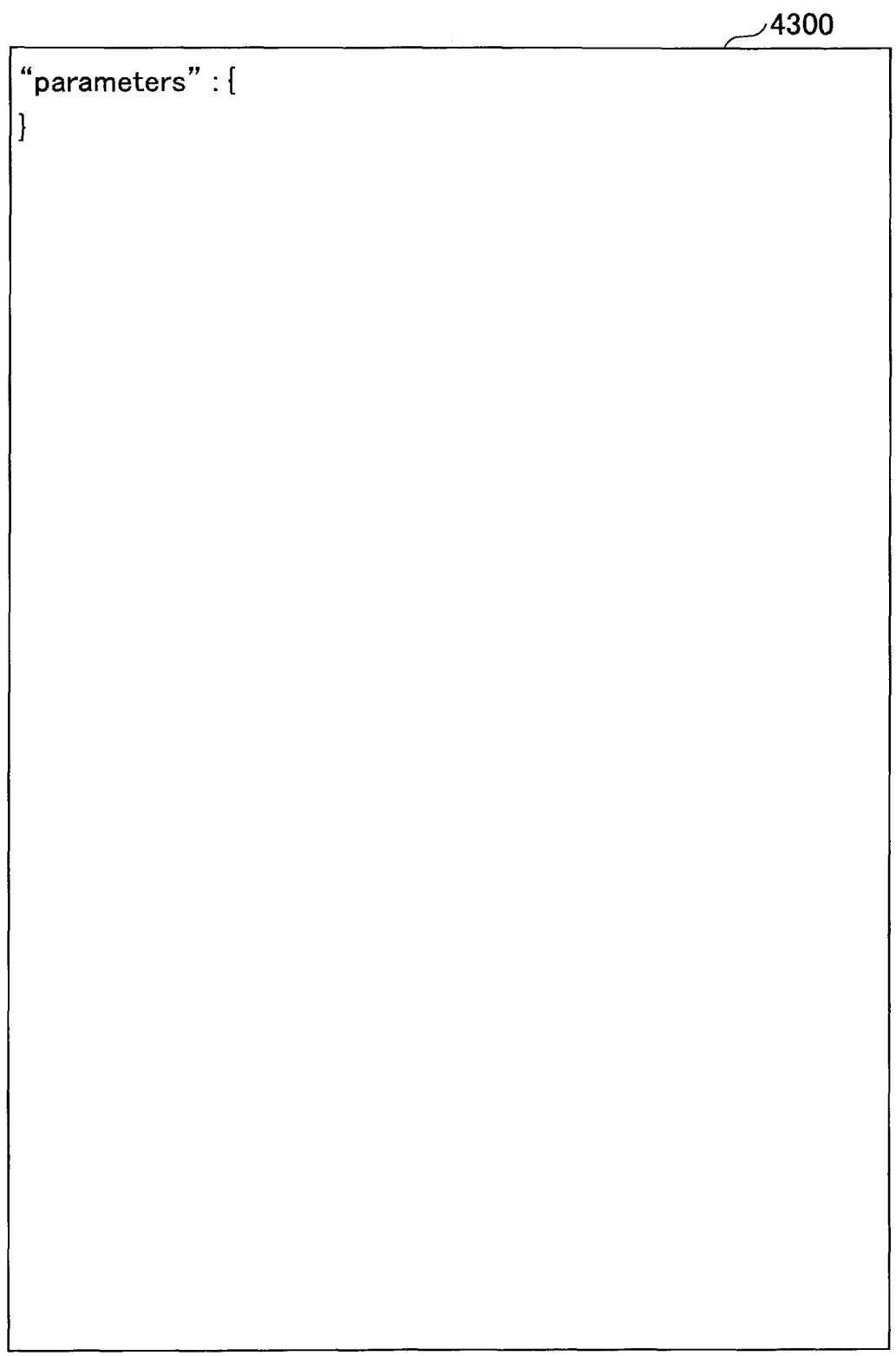

```
"parameters" : {
    "from" : "hoge@fuga.com",
    "to" : "hogehoge@fuga.com",
    "cc" : null,
    "bcc" : null,
    "subject" : "report of storage destination URL",
    "body" : "The file is stored into the external storage A.
              The storage destination URL is
              http://storageA.com/folderB/file1.txt."
}
```

INFORMATION PROCESSING SYSTEM, INFORMATION PROCESSING APPARATUS, METHOD FOR PROCESSING INFORMATION, AND INFORMATION PROCESSING PROGRAM

TECHNICAL FIELD

The present invention relates to an information processing system, an information processing apparatus, a method for processing information, and an information processing program.

BACKGROUND ART

In recent years, various external services are provided by cloud computing or the like. For example, there is known an external service, in which electronic data designated by a user are stored in an external storage or the like.

Further, known is a technique of generating a clerical flow for controlling components performing various processes based on a predetermined clerical flow model (for example, PTL 1). In this technique, the components are combined by the generated clerical flow, and a sequence of processes implementing a clerical process is executed.

CITATION LIST

Patent Literature

[PTL 1] Japanese Patent No. 5112085

SUMMARY OF INVENTION

An embodiment of the present invention is provided in consideration of the above, and the object of the present invention is to execute a sequence of processes formed by combining components.

Solution to Problem

According to one aspect of the present invention, there is provided an information processing system including at least one information processing apparatus, in which a plurality of programs are installed to respectively perform a predetermined process so as to implement: a memory unit configured to store, for each application executing a sequence of processes using electronic data, program identification information of identifying the at least one program from among the plurality of programs executing the sequence of processes, a parameter used to execute each program from among the at least one program, and flow information defining an execution order of the at least one program while associating app identification information for identifying the application with the program identification information, the parameter, and the flow information, an acquiring unit configured to acquire, in response to a receipt of information related to the electronic data and a request including the app identification information from one apparatus from among at least one apparatus coupled to the information processing system, the flow information stored in the memory unit in association with the app identification information included in the request, and an executing unit configured to cause each program of the at least one program identified by the program identification information defined in the flow information which is acquired by the acquiring unit to be executed using the parameter defined in the flow information in accordance with the execution order defined in the flow information to execute the sequence of processes using the electronic data in accordance with the information related to the electronic data included in the request, the executing unit replacing, in a case where a data value of a data item included in the parameter used to execute the program is designated to be replaced by another data value, the data value with the another data value.

BRIEF DESCRIPTION OF DRAWINGS

FIG. 1 is a diagram illustrating a system structure of an exemplary information processing system of a first embodiment.

FIG. 2 is a diagram illustrating a hardware structure of an exemplary service providing system of the first embodiment.

FIG. 3 is a diagram illustrating an exemplary hardware structure of an apparatus of the first embodiment.

FIG. 4 is a diagram illustrating a functional structure of an exemplary information processing system of the first embodiment.

FIG. 5A illustrates an exemplary common I/F and a unique I/F.

FIG. 5B illustrates the exemplary common I/F and the unique I/F.

FIG. 5C illustrates the exemplary common I/F and the unique I/F.

FIG. 5D illustrates the exemplary common I/F and the unique I/F.

FIG. 6 is a processing block diagram of an exemplary logic processing unit of the first embodiment.

FIG. 7 illustrates an exemplary type-conversion information table.

FIG. 8 illustrates exemplary process flow information.

FIG. 9 is a sequence chart of an exemplary overall process for a service use of the first embodiment.

FIG. 10 illustrates an exemplary screen transition from an service view screen to a service screen.

FIG. 11 is a sequence chart of an exemplary execution process for a process flow of the first embodiment.

FIG. 12A illustrates exemplary resource administration information.

FIG. 12B illustrates the exemplary resource administration information.

FIG. 13A illustrates exemplary parameters.

FIG. 13B illustrates the exemplary parameters.

FIG. 14 illustrates exemplary resource administration information in a case where error information is added.

FIG. 15 is a processing block diagram of an exemplary logic processing unit of a second embodiment.

FIG. 16 is a sequence chart of an exemplary execution process for a process flow of the second embodiment.

FIG. 17 illustrates other exemplary process flow information.

FIG. 18A illustrates other exemplary resource administration information.

FIG. 18B illustrates the other exemplary resource administration information.

FIG. 19A illustrates other exemplary parameters.

FIG. 19B illustrates other exemplary parameters.

DESCRIPTION OF EMBODIMENTS

Hereinafter, embodiments of the present invention are described in detail with reference to figures.

First Embodiment

<System Structure>

Referring to FIG. 1, an information processing system 1 of the first embodiment is described. FIG. 1 is a diagram illustrating an exemplary system structure of the information processing system 1 of the first embodiment.

The information processing system 1 illustrated in FIG. 1 includes a service providing system 10, an apparatus 20, and an external storage system 30, which are communicably coupled through a wide area network N1 such as the Internet.

The service providing system 10 is implemented by at least one information processing apparatus and provides various services substantialized by a sequence of processes, which collaborate with an external service such as cloud service through the network N1.

The service provided by the service providing system 10 of the first embodiment is specifically described later. Hereinafter, the sequence of processes is referred to as a "process flow".

Although the external service to be described in the first embodiment is specifically the cloud service, the external service is not limited to this cloud service. For example, the first embodiment may be applied to various external services such as a service provided by an application service provider (ASP) and a web service, which are provided through the network.

The apparatuses 20 are various electronic apparatuses used by a user. Said differently, the apparatus 20 is, for example, an image forming apparatus such as a multifunction peripheral (MFP), a personal computer (PC), a projector, an electronic whiteboard, a digital camera, or the like. The user uses the apparatus 20 to use various services provided by the service providing system 10.

Hereinafter, when each of multiple apparatuses 20 are distinguished, a suffix is added such as an "apparatus 201" and an "apparatus 202".

The external storage system 30 is a computer system providing a cloud service called a storage service or an online N1. The storage service is a service of lending a memory area of a storage of the external storage system 30.

Hereinafter, when each of the multiple external storage systems 30 is distinguished, a suffix is added such as an "external storage system 301" and an "external storage system 302". Further, the name of the storage service provided by the external storage system 301 is a "storage A", and the name of the storage service provided by the external storage system 301 is a "storage B".

The external storage system 30 may be a system implemented by multiple information processing apparatuses.

The structure of the information processing system 1 illustrated in FIG. 1 is an example and may be another structure. For example, the information processing system 1 of the first embodiment includes various apparatuses, each of which performs at least one of an input and an output of the electronic data. These apparatuses may use various services provided by the service providing system 10.

<Hardware Structure>

Referring to FIG. 2, described next is the hardware structure of the service providing system 10 included in the information processing system 1 of the first embodiment. FIG. 2 is a diagram illustrating the hardware structure of an exemplary service providing system 10 of the first embodiment.

The service providing system 10 illustrated in FIG. 2 includes an input device 11, a display device 12, an external interface (I/F), and a random access memory (RAM) 14. Further, the service providing system 10 includes a read only memory (ROM) 15, a central processing unit (CPU) 16, a communication interface (I/F) 17, and a hard disk drive (HDD) 18. Each of the ROM 15, the CPU 16, a communication I/F 17, and the HDD 18 is connected by the bus B.

The input device 11 includes a keyboard, a mouse, a touch panel, and the like, by which the user inputs various operation signals. The display device 12 includes a display or the like to display a process result acquired by the service providing system 10. At least one of the input device 11 and the display device 12 may be in a mode of being connected to the service providing system 10 so as to be used.

The communication I/F 17 is an interface provided to couple the service providing system 10 with the network N1. Thus, the service providing system 10 can com-municate with another apparatus through the communication I/F 17.

The HDD 18 is a non-volatile memory device that stores programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with an external apparatus. The external apparatus includes a recording medium 13a and so on. With this, the service providing system 10 can read information from the recording medium 13a and write information to the recording medium 13a through the external I/F 13. The recording medium 13a is a flexible disk, a CD, a DVD, an SD memory card, a USB memory, or the like.

The ROM 15 is a non-volatile semiconductor memory that can store a program or data even when a power source is powered off. The ROM 15 stores a program and data such as a basic input/output system (BIOS), an operating system (OS) setup, a network setup, or the like, which are executed at a time of starting up the service providing system 10. The RAM 14 is a volatile semiconductor memory configured to temporarily store the program and the data.

The CPU 16 reads the program and/or data from the memory device such as the ROM 15 and the HDD 18. The read program or the read data undergo a process to thereby substantialize a control or a function of the entire service providing system 10.

The service providing system 10 of this embodiment can substantialize various processes described below by having the above hardware structure of the service providing system 10 illustrated in FIG. 2.

Referring to FIG. 3, described next is the hardware structure of an image forming apparatus, which is the apparatus 20 included in the information processing system 1 of the embodiment. FIG. 3 is a diagram illustrating a hardware structure of an exemplary apparatus 20 of the first embodiment.

The apparatus 20 illustrated in FIG. 3 includes a controller 21, an operation panel 22, an external interface (I/F) 23, a communication I/F 24, a printer 25, and a scanner 26. The controller 21 includes a central processing unit (CPU) 31, a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and executes the process. Thus, the CPU 31 is an arithmetic device substantializing a control and a function of the entire apparatus 20.

The operation panel 22 includes an input unit configured to receive an input from the user and a display unit configured to display. The external I/F 23 is an interface with the external apparatus. The external apparatus includes a recording medium 23a and so on. With this, the apparatus 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the apparatus 20 with the network. Thus, the apparatus 20 can perform data communications through the communication I/F 24. The printer 25 is provided to print data. The scanner 26 is a reading device that reads an original and generates an electronic file (an image file).

The service providing system 20 of the first embodiment includes a hardware structure illustrated in FIG. 3 to substantialize various processes described below.

<Service Provided by Service Providing System>

The service provided by the service providing system 10 of the first embodiment is described later. Hereinafter, description is given for a case where the apparatus 20 is an image forming apparatus.

The service providing system 10 of the first embodiment stores an electronic file, which is generated by scanning an original by the apparatus 20, into the external storage system 30 and send a mail describing a storage destination uniform resource locator (URL) indicative of the storage destination so as to provide a service.

Description of the service providing system 10 of the first embodiment is given for a case where the above service (hereinafter, referred to as a "scan delivery service") is provided.

However, a service provided by the service providing system 10 is not limited to the scan delivery service. For example, the service providing system 10 of the first embodiment may provide a service, in which the electronic file generated by scanning the original in the apparatus 20 is subjected to an optical character recognition (OCR) process and stored in the external storage system 30. For example, the service providing system 10 may provide a service of printing the electronic file stored in the external storage system 30 by the apparatus 20.

<Functional Structure>

Referring to FIG. 4, the functional structure of the information processing system 1 of the first embodiment is described. FIG. 4 is a diagram illustrating an exemplary functional structure of the information processing system 1 of the first embodiment.

The apparatus 20 includes an UI controlling unit 210 and a scan processing unit 220. The UI controlling unit 210 and the scan processing unit 220 are substantialized when one or more programs installed in the apparatus 20 causes the CPU 31 to execute a process.

The UI controlling unit 210 causes the operation panel 22 to display various screens. Further, the UI controlling unit 210 receives various operations of the user on various screens displayed on the operation panel 22.

The scan processing unit 220 responds to the operation that is input by the user and received by the UI controlling unit 210 and then scans the original using the scanner 26 to generate the electronic file.

The service providing system 10 includes a service processing unit 110, a document servicing unit 150, and an external-storage collaborating unit 160. The service processing unit 110, the document servicing unit 150, and the external-storage collaborating unit 160 are implemented when one or more programs installed on the service providing system 10 are executed by the CPU 16.

Further, the service providing system 10 includes an application (app) information memory unit 180 and a resource administration information memory unit 190. The app information memory unit 180 and the resource administration information memory unit 190 may be implemented by using the HDD 18. At least one of the app information memory unit 180 and the resource administration information memory unit 190 may be implemented by using a memory device coupled to the service providing system 10 through the network.

The service processing unit 110 conducts a process related to various services provided by the app information 1000 (described below) in response to a request from the apparatus 20. The service processing unit 110 includes an app administering unit 120, a logic processing unit 130, and a data I/F unit 140.

The app administering unit 120 administers app information 1000 stored in an app information memory unit 180. For example, the app administering unit 120 returns the screen definition information 1100 included in the app information 1000 in response to a request from the UI controlling unit 210 of the apparatus 20. The screen definition information 1100 is information for displaying a service screen which is a screen for using the service provided by the app information 1000.

Further, the app administering unit 120 returns the process flow information 1200 included in the app information 1000 in response to a request from the logic processing unit 130. The process flow information 1200 is information related to a sequence of processes (a process flow) for substantializing a service (e.g., a scan delivery service) provided by the app information 1000.

The logic processing unit 130 acquires the process flow information 1200 included in the app information 1000 through the app administering unit 120 in response to a request from the UI controlling unit 210 of the apparatus 20. The logic processing unit 130 requests the document servicing unit 150, the file processing unit 171 of the external-storage collaborating unit 160, or the like in accordance with the acquired process flow information 1200 to execute the process, and therefore the sequence of processes is executed in accordance with the process flow information 1200.

At this time, the logic processing unit 130 administers a parameter used for the sequence of processes, the processed result of the sequence of processes, or the like using resource administration information 190D stored in the resource administration information memory unit 190.

The logic processing unit 130 executes the sequence of processes in accordance with the process flow information 1200 by combining the components described below.

With this, various services provided by the app information 1000 are substantialized by the service providing system 10 of the first embodiment. The logic processing unit 130 is described in detail later.

The data I/F unit 140 sends various requests (e.g., a folder view acquisition request to acquire a folder view) to a data processing unit 172 of the external-storage collaborating unit 160 in response to a request received from the UI controlling unit 210 of the apparatus 20.

The document servicing unit 150 is a program group (a module group) executing various processes. These programs are executed by a component (described below) in response to a request from the logic processing unit 130.

The document servicing unit 150 includes "sending of mail" 151, in which a mail is made and the made mail is sent to a designated destination.

The document servicing unit 150 may include various programs such as a program of executing an OCR process for the electronic file and a program of converting the electronic file into print data, which can be printed by the apparatus 20.

The external-storage collaborating unit 160 requests the external storage system 30 to execute various processes (e.g., a folder view acquisition request to acquire the folder view) in response to a request received from the logic processing unit 130 or the data I/F unit 140.

The service providing system 10 of the first embodiment includes the external-storage collaborating units 160, which respectively correspond to the external storage systems 30 processing in collaboration with the service providing system 10. Said differently, the service providing system 10 of the first embodiment includes the external-storage collaborating unit 1601 provided to send various requests to an external storage system 301. Similarly, the service providing system 10 of the first embodiment includes an external-storage collaborating unit 1601 provided to send various requests to an external storage system 302.

Hereinafter, when the multiple external-storage collaborating units 160 are distinguished, individual units are designated by adding a suffix such as the "external-storage collaborating unit 1601" and the "external-storage collaborating unit 1602".

The external-storage collaborating unit 1601 includes the file processing unit 1711 for receiving the request from the logic processing unit 130 and the data processing unit 1721 for receiving the request from the data I/F unit 140.

The file processing unit 1711 includes a common I/F 17111 and a unique I/F 17121, in which an application programming interface (API) for conducting a file operation (e.g., an acquisition, a storage, and an edit) to the electronic file stored in the external storage system 30 is defined.

The common I/F 17111 is an API used among the multiple external storage systems 30 in common as, for example, the API illustrated in FIG. 5A. Said differently, the common I/F 17111 of the file processing unit 1711 is a group of APIs for using a function (e.g., a file acquisition, and a file storage) related to the file operation which can be used by all the external storage systems 30.

The unique I/F 17121 is an API used by a specific external storage system 30 as, for example, the API illustrated in FIG. 5B. Said differently, the unique I/F 17121 of the file processing unit 1711 is an API group of APIs for using a function (e.g., an addition of a file to a document) related to the file operation which is provided by the specific external storage systems 30.

Therefore, the common I/F 17111 is similarly defined for all the external-storage collaborating units 160. On the other hand, the unique I/F 17121 is defined for the external-storage collaborating unit 160 corresponding to the specific external storage system 30, in which the API defined by the unique I/F 17121 can be used.

On the other hand, the data processing unit 1721 includes a common I/F 17211 and a unique I/F 17221, in which an API for acquiring meta data (e.g., an file view, and a folder view) of bibliographic information of the electronic file stored in the external storage system 30 is defined.

The common I/F 17211 is an API used among the multiple external storage systems 30 in common as, for example, the API illustrated in FIG. 5C. Said differently, the common I/F 17211 of the data processing unit 1721 is an API group of APIs for using a function (e.g., a file view acquisition, and a folder view acquisition) related to a meta data acquisition which can be used by all the external storage systems 30.

The unique I/F 17221 is an API, which can be used by the specific external storage system 30, such as the API illustrated in FIG. 5D. Said differently, the unique I/F 17221 of the data processing unit 1721 is an API group of APIs for using a function (e.g., an acquisition of an image file view), which is related to an acquisition of metadata and is provided by the specific external storage systems 30.

Therefore, the common I/F 17211 is similarly defined for all the external-storage collaborating units 160. On the other hand, the unique I/F 17221 is defined for the external-storage collaborating unit 160 corresponding to the specific external storage system 30, in which the API defined by the unique I/F 17121 can be used.

As described, the service providing system 10 of the first embodiment includes the external-storage collaborating units 160 respectively corresponding to the external storage systems 30, which respectively process in collaboration with the service providing system 10. Therefore, in a case where the external storage system 30 to be the collaboration destination is added or deleted (hereinafter, referred to as an "addition or the like"), the external-storage collaborating unit 160 corresponding to the external storage system 30 may be subjected to the addition or the like to the service providing system 10.

Therefore, in the service providing system 10 of the first embodiment, an influence caused by the addition or the like of the external storage system 30, which is to be the collaboration destination, can be localized. Said differently, in the service providing system 10 of the first embodiment, the addition or the like of the external storage system 30, which is to be the collaboration destination, can be done without influencing the other functional units (i.e., the service processing unit 110, the document servicing unit 150, or the like). Here, a software development kit (SDK) may be used for the addition or the like of the external-storage collaborating unit 160.

Further, in the file processing unit 1711 of the external-storage collaborating unit 160, the common I/F 17111 and the unique I/F 17121 are defined as different modules or the like. Further, the APIs defined by the common I/F 17111 and the unique I/F 17121 can be used ("external storage name" is variable) by designating the "external storage name" uniquely identifying the external storage system 30.

With this, in a case where the external-storage collaborating unit 160 is added, it is possible to reuse the common I/F 17111 defined in the file processing unit 1711 of the other external-storage collaborating unit 160. Said differently, in a case where the external-storage collaborating unit 160 is added, it is sufficient for the file processing unit 1711 of the external-storage collaborating unit 160 to be added to develop only the unique I/F 17121. Similarly, it is sufficient for the data processing unit 1721 of the external-storage collaborating unit 160 to be added to develop only the unique I/F 17221 without developing the common I/F 17211.

The app information memory unit 180 stores the app information 1000, which cor-responds to the application providing various services in collaboration with the external storage system 30. The app information 1000 includes screen definition information 1100 for causing the apparatus 20 to display the service screen and process flow information 1200 being information related to the sequence of processes (the process flow) for substantializing the service. The process flow information 1200 is described in detail later.

The app information 1000 is associated with the app ID for uniquely identifying this app information 1000. For example, the app ID "app001" is associated with the app information 1000 using the scan function of the apparatus 20. Similarly, for example, the app ID "app002" is associated with the app information 1000 using the print function of the apparatus 20.

Therefore, the process flow information 1200 for substantializing the service of "scan delivery" of the first embodiment is included in the app information 1000 corresponding to the app ID "app001". Meanwhile, the app information 1000 may include multiple sets of process flow information 1200.

The resource administration information memory unit 190 stores the parameter used for the sequence of processes according to the process flow information or resource administration information 190D administering the processed result of each process of the sequence of processes. The resource administration information 190D is described in detail later.

Referring to FIG. 6, a detailed functional structure of the logic processing unit 130 is described. FIG. 6 is a diagram illustrating the functional structure of an exemplary logic processing unit 130 of the first embodiment.

The logic processing unit 130 includes a flow executing unit 131, a component administering unit 132, a component group 133, a type conversion administering unit 134, a type conversion group 135, a resource administering unit 136, and a parameter evaluating unit 137. Further, the logic processing unit 130 uses the type-conversion information table 2000.

The flow executing unit 131 acquires the process flow information 1200 included in the app information 1000 through the app administering unit 120 in response to a request from the UI controlling unit 210 of the apparatus 20. Then, the flow executing unit 131 requests the component to execute the process in accordance with the acquired process flow information 1200 to execute the sequence of processes in accordance with the process flow information 1200.

Here, the component is, for example, a module for executing one process included in the sequence of processes (the process flow) in accordance with the process flow information 1200. Therefore, the sequence of processes in accordance with the process flow information 1200 is substantialized by combining processes, each of which is executed by at least one component. The component is defined by, for example, a class, a mathematical function, or the like.

After the flow executing unit 131 acquires the process flow information 1200, the flow executing unit 131 stores the parameter or the like used for the sequence of processes performed in accordance with the process flow information as the resource administration information 190D into the resource administration information memory unit 190 through the resource administering unit 136.

Here, the parameter is various information pieces input into the component executing various processes included in the sequence of processes. The parameter includes a key indicative of a data item and a resource indicative of the value of the data item in the key.

The component administering unit 132 generates the component in response to a request from the flow executing unit 131. Here, the generation of the component means that the component defined by, for example, the class, the mathematical function, or a like is deployed on the memory (for example, the RAM 14).

The component group 133 is a set of the components. The component group 133 includes a delivery A component 1331 for storing (uploading) an electronic file in the external storage system 301 (an external storage A). The component group 133 includes a mail component 1332 which makes the mail and sends the mail to a designated address.

The component group 133 may include a delivery B component for delivering the electronic file to an external storage system 302 (an external storage) and an OCR component for providing an OCR process to the electronic file. As described, various components executing various processes may be included in the component group 133.

Further, each of these components includes a component common I/F 1330. A component common I/F 1330 is an application programming interface (API) defined for each of these components in common, and includes an API for generating the component and another API for requesting the component to execute the process.

As described, it is possible to localize an influence caused by the addition or the like of the component because each of the components has the component common interface (I/F) 1330. Said differently, the service providing system 10 of the first embodiment can conduct the addition or the like without influencing the flow executing unit 131 and the component administering unit 132, for example.

The type conversion administering unit 134 administers a type conversion of a data type. The data type which can be handled by each of the components is previously determined. Therefore, the type conversion administering unit 134 generates a type conversion defined in the type conversion group 135 by referring to the type-conversion information table 2000 in response to a request from the component.

The type conversion administering unit 134 requests to execute a type conversion process for the generated type conversion. With this, the type conversion administering unit 134 conducts the type conversion, by which the component of a request source can handle.

Here, referring to FIG. 7, the type-conversion information table 2000 is described in detail. FIG. 7 illustrates an exemplary type-conversion information table.

Type conversion information stored in the type-conversion information table 2000 includes a data type before conversion, a data type after conversion, and a type conversion to be generated. Said differently, the type conversion information is associated with the type conversion to be generated for converting the data type before the conversion to the data type after the conversion for each of the data type before conversion and the data type after conversion.

Therefore, in a case where data are converted from a data type "InputStream" indicative of stream data to a data type "LocalFilePath" indicative of a path (an address) of the electronic file stored in the memory device or the like, a first type conversion may be generated.

Here, the generation of the type conversion means that the type conversion defined by, for example, the class is deployed on the memory (for example, the RAM 14). For example, the data type is "File" indicative of the entity of the electronic file in addition to the above described "InputStream" and "LocalFilePath".

The type conversion group 135 is a set of the type conversions. The type conversion group 135 includes a first type conversion 1351 converting data of the data type "InputStream" to data of the data type "LocalFilePath".

The type conversion group 135 may include various type conversions such as a second type conversion of converting the data having the data type "LocalFilePath" so as to have the data type "File".

Further, each of these type conversions includes a type conversion common I/F 1350. The type conversion common I/F 1350 is an API defined for each type conversion in common, and includes an API for generating the type conversion and another API for requesting the type conversion to execute the process.

As described, it is possible to localize an influence caused by the addition or the like of the type conversion because each of the type conversions has the component common interface (I/F) 1350. Said differently, the service providing system 10 of the first embodiment can conduct the addition or the like without influencing the type conversion administering unit 134 and so on, for example.

The resource administering unit 136 administers the resource administration information 190D stored in the resource administration information memory unit 190. Said differently, the resource administering unit 136 causes the resource administration information memory unit 190 store the parameter or the like used for the sequence of processes in accordance with the process flow information 1200 as the resource administration information 190D.

The resource administering unit 136 returns the parameter included in the resource administration information 190D stored in the resource administration information memory unit 190 in response to a request from the parameter evaluating unit 137.

The parameter evaluating unit 137 evaluates the parameter returned from the resource administering unit 136. The parameter evaluating unit 137 determines whether the returned parameter includes replacement designation. The replacement designation is designation for replacing a resource of a key included in the parameter with a resource of another key.

In a case where the parameter evaluating unit 137 determines that the returned parameter includes replacement designation, the parameter evaluating unit 137 replaces a resource provided with the replacement designation in the returned parameter with a corresponding resource.

Here, referring to FIG. 8, the process flow information 1200 is described in detail. FIG. 8 illustrates exemplary process flow information.

The process flow information 1200 illustrated in FIG. 8 is an example of the process flow information 1200 included in the app information 1000 of the app ID "app001". The process flow information 1200 illustrated in FIG. 8 relates to the sequence of processes for substantializing the service (the scan delivery service), in which the original is scanned by the apparatus 20 to generate the electronic file, the generated electronic file is stored in the external storage A, and thereafter the storage destination URL of the generated electronic file is sent by a mail.

The process flow information 1200 includes a flow identification data (ID) 1201 uniquely identifying identification information 1200, a flow name 1202 indicating the name of the process flow information 1200, and a detailed flow 1203 indicating the process content of the sequence of processes.

Further, the detailed flow 1203 includes a process content 1204 indicative of a delivery process of storing the electronic file into the external storage A and a process content 1205 indicative of a mail process of sending the storage destination URL by the mail.

In the process content 1204, the name "delivery A component" of a component of executing the delivery process and a parameter input into the component are designated. Here, the parameter is designated in a format of ["key": "resource"].

Therefore, the parameters in the process content 1204 are designated to be a key "filename" indicative of an electric file name of a delivery target and a resource "null" (the blank value) indicative of the value of the key. Similarly, the parameters in the process content 1204 are designated to be a key "folder" indicative of a storage destination folder in the external storage A and a resource "null" indicative of the value of the key. As described, the designated parameters in the process content 1204 are input into the delivery A component 1331.

In the process content 1205, the name "mail component" of the component of executing the mail process and a parameter input into the component are designated. Similarly, the parameters in the process content 1205 are designated to be a key "from" indicative of a sending source of the mail and a resource "hoge@fuga.com" indicative of the value of the key. Similarly, the parameters in the process content 1205 are designated to be a key "to" indicative of a sending source of the mail and a resource "null", a key "cc" indicative of a carbon copy (CC) destination of the mail and a resource "null", and a key "bcc" indicative of a blind carbon copy (BCC) destination of the mail and a resource "null". Similarly, the parameters in the process content 1205 are designated to be a key "subject" indicative of the subject line of the mail and a resource "report of storage destination URL" and a key "body" indicative of the body of the mail and a resource "${delivery A component.result.fileurl}".

Here, the a resource "${delivery A component.result.fileurl}" of the key "body" is a replacement designation. This replacement designation means that the resource of the key "body" is replaced by the resource of the key "fileurl" in a process result (result) of the delivery A component. Within the first embodiment, the replacement designation is designated in a format of "${[component name].[result].[key]}". Therefore, the resource of the key undertaking the replacement designation may be replaced by the resource of the designated key in the process result (the result) of the component having the component name designated by the replacement designation.

Within the first embodiment, the replacement designation may be designated in a format of "${[component name].[parameters].[key]}". With this, the resource of the key undertaking the replacement designation can be replaced by the resource of the key designated in the parameters of the designated component.

As described, the designated parameters in the process content 1205 is input into the mail component 1332. Further, the parameter input into the mail component 1332 includes a replacement designation, by which the processed result of the other component (the delivery A component 1331) replaces the input into the mail component 1332.

Thus, a subsequent component (the mail component 1332) can perform the process using the processed result of the preceding component (the delivery A component 1331). Further, by replacing the resource, the preceding component can output the processed result using an arbitrary key without considering the key which can be input by the subsequent component. Said differently, the subsequent component can do the process using the processed result of the arbitrary preceding component.

<Detailed Process>

Described next is a detailed process of the information processing system 1 of the first embodiment.

Next, referring to FIG. 9, described is a process in a case where a user U uses the apparatus 20 to use a service provided by the application (the app information 1000) of the service providing system 10. FIG. 9 is a sequence chart of an exemplary overall process for a service use of the first embodiment.

The user U uses the apparatus 20 and conducts a display operation to display a service view provided by the app information 1000 (step S901).

After the UI controlling unit 210 of the apparatus 20 receives a display operation for displaying the service view, the UI controlling unit 210 sends a service view acquisition request to acquire the service view to the app administering unit 120 of the service providing system 10 (step S902). After the app administering unit 120 receives the service view acquisition request, the app administering unit 120 returns service view screen information.

The service view screen information is provided to display the service view provided by the app information 1000. The service view screen information is indicated in a data format of, for example, HTML. The service view screen information includes the app ID of the app information 1000, and the flow ID and the flow name of the process flow information 1200 included in the app information 1000.

After the UI controlling unit 210 of the apparatus 20 receives the service view screen information, the UI controlling unit 210 causes the operation panel 22 to display, for example, the service view screen 3100 illustrated in FIG. 10 in accordance with the service view screen information (step S903). The service view screen 3100 illustrated in FIG. 10 includes a service name view 3101, in which a view of the service names are displayed based on the flow ID and the flow name, which are included in the service view screen information.

The flow name of the process flow information 1200 included in the app information 1000 is the service name in the service view screen 3100 illustrated in FIG. 10. However, the service name is not limited to this service name, and an arbitrary service name may be displayed.

Next, the user U conducts an operation of selecting a desired service from a service name view 3101 of the service view screen 3100 (step S904). Described next is a case where "scan delivery 1" is selected by the user U from the service name view 3101 of the service view screen 3100.

After the UI controlling unit 210 of the apparatus 20 receives a selection operation of selecting the service, the UI controlling unit 210 sends a service screen acquisition request to acquire the service screen to the app administering unit 120 of the service providing system 10 (step S905). This service screen acquisition request includes the app ID "app001" of the app information 1000A of providing the service "scan delivery 1" selected by the user U and a flow ID "flow001" of the process flow information 1200 substantializing the service.

After the app administering unit 120 receives the service screen acquisition request to acquire the service screen, the app administering unit 120 acquires the screen definition information 1100 corresponding to the app ID "app001" and the flow ID "flow001", which are included in the service screen acquisition request, and returns the acquired screen definition information 1100.

After the UI controlling unit 210 of the apparatus 20 receives the screen definition information 1100, the UI controlling unit 210 sends a display information acquisition request to acquire display information for displaying the service screen to the data I/F unit 140 of the service providing system 10 (step S906).

The display information is each selection element of a selection column on the service screen. The display information is, for example, a folder view (a view of folder names and folder IDs) of candidates of folders at a storage destination in the external storage. Hereinafter, described is a case where the display information acquisition request to acquire the display information is the acquisition request to acquire the folder view indicative of the candidates of the folder at the storage destination in the external storage A.

The folder view acquisition request for the folder view can be conducted using the API "/external storage name/data/folders" illustrated in FIG. 5C. Said differently, the UI controlling unit 210 sends a hypertext transfer protocol (HTTP) request as, for example, "/storage-a/data/folders" to the data I/F unit 140 to request to acquire the folder view of the external storage A.

After the data I/F unit 140 of the service providing system 10 receives the display information acquisition request for the display information, the data I/F unit 140 transfers the acquisition request to the data processing unit 172 of the corresponding external-storage collaborating unit 160 (step S907). Said differently, the data I/F unit 140 transfers the received display information acquisition request for the received display information to the data processing unit 1721 of the external-storage collaborating unit 1601.

After the data processing unit 1721 of the external-storage collaborating unit 1601, the data processing unit 1721 sends a folder view acquisition request to acquire the folder view to the external storage A and acquires folder view information indicative of the folder view (step S908). Said differently, the data processing unit 1721 acquires the folder view information from the external storage A using the API defined in the common I/F 17211.

The data processing unit 1721 returns the folder view information to the UI controlling unit 210 through the data I/F unit 140.

After the UI controlling unit 210 of the apparatus 20 receives the folder view information, the UI controlling unit 210 causes the folder view information to be reflected in the screen definition information 1100 so that a service screen 3200 illustrated in, for example, FIG. 10 is displayed on the operation panel 22 (step S909).

The service screen 3200 illustrated in FIG. 10 is a screen for using the service name "scan delivery 1" selected by the user U. The service screen 3200 illustrated in FIG. 10 includes a file-name input box 3201, a storage-destination-folder selection box 3202, a destination designation box 3203, a CC designation button 3204, a BCC designation button 3205, and a scan execution button 3206.

In the service screen 3200, selection elements in the storage-destination-folder selection box 3202 are set based on folder list information acquired from the external storage A in step S908.

Next, the user U inputs a desired file name into the file-name input box 3201 and selects a desired storage destination folder from the storage-destination-folder box 3202 on the service screen 3200. Further, the user U inputs a mail address for reporting the storage destination URL indicative of the storage destination folder in the external storage A into the destination designation box 3203. The user U may input the mail address into the CC designation button 3204 and the BCC designation button 3205.

While the original is set to the scanner 26 of the apparatus 20, the scan execution button 3206 is pushed down (step S910).

Hereinafter, description is given to a case where the user U inputs a file name "file1" into the file-name input box 3201 and selects "folderB" from the storage-destination-folder selection box 3202. Further, description is given to a case where the user U inputs a mail address "hogehoge@fuga.com" into the destination designation box 3203 and pushes the scan execution button 3206 without inputting into the CC designation button 3204 and the BCC designation button 3205.

After the UI controlling unit 210 of the apparatus 20 receives the push of the scan execution button 3206, the UI controlling unit 210 sends a scan execution request to execute scan to the scan processing unit 220 (step S911).

After the scan processing unit 220 of the apparatus 20 receives the scan execution request to execute the scan, the scan processing unit 220 controls the scanner 26, reads the set original, and generates an electronic file (step S912). The scan processing unit 220 returns a scan result indicative of the end of the scan to the UI controlling unit 210.

After the UI controlling unit 210 of the apparatus 20 receives the scanned result, the UI controlling unit 210 sends a process flow execution request to execute the process flow substantializing a service "scan delivery 1" to the logic processing unit 130 of the service providing system 10 (step S913).

This process flow execution request includes the app ID "app001" of the app information 1000 for providing the service "scan delivery 1" and the flow ID "flow001" of the process flow information 1200 for substantializing the service. Further, the process flow execution request includes the electronic file generated by the scan and input information (the file name "file1", the storage destination folder "folderB", a destination mail address "hogehoge@fuga.com", and so on) input in the service screen 3200 by the user U.

The logic processing unit 130 of the service providing system 10 acquires the process flow information 1200 corresponding to the app ID and the flow ID, which are included in the received process flow execution request, and executes the sequence of processes in accordance with the process flow information 1200 (step S914). Then, the logic processing unit 130 returns the processed result of the sequence of processes to the UI controlling unit 210.

With this, the service providing system 10 of the first embodiment executes the sequence of processes substantializing the service "scan delivery 1" and provides this service to the apparatus 20.

Referring to FIG. 11, a detailed process flow execution process to execute the process flow in the above step S914 is described. FIG. 11 is a sequence chart of an exemplary process flow execution process to execute the process flow of the first embodiment.

After the flow executing unit 131 receives the process flow execution request, the flow executing unit 131 sends a process flow information acquisition request to acquire the process flow information to the app administering unit 120 (step S1101). The process flow information acquisition request includes the app ID "app001" and the flow ID "flow001", which are included in the received process flow execution request.

The app administering unit 120 acquires the process flow information 1200 corresponding to the app ID "app001" and the flow ID "flow001", which are included the received process flow information acquisition request, from the app information memory unit 180 and returns the process flow information 1200. With this, the process flow information 1200 illustrated in FIG. 8 is returned to the flow executing unit 131.

Next, after the flow executing unit 131 receives the process flow information 1200, the flow executing unit 131 sends a resource administration information storage request to store the resource administration information to the resource administering unit 136 (step S1102). The resource administration information storage request includes the process flow execution request received from the UI controlling unit 210 in step S1101 and the process contents 1204 and 1205 included in the process flow information 1200.

After the resource administering unit 136 receives the resource administration information storage request to store the resource administration information, the resource administering unit 136 generates, for example, resource administration information 190D illustrated in FIG. 12A in accordance with the process flow execution request included in the resource administration information storage request and the process contents S1204 and S1205. The resource administering unit 136 stores the generated resource administration information 190D into the resource administration information memory unit 190 (step S1103) and returns the stored result to the flow executing unit 131.

The resource administration information 190D illustrated in FIG. 12A includes the execution request 191, the parameter 192, and the processed result 193.

The execution request 191 is the process flow execution request included in the storage request of the resource administration information. Referring to FIG. 12A, the process flow execution request sent from the UI controlling unit 210 in a format of HTTP request.

The parameter 192 includes a delivery A component parameter 1921 and a mail component parameter 1922.

The delivery A component parameter 1921 is generated in accordance with the process content 1204 and the input information included in the process flow execution request. Said differently, the delivery A component parameter 1921 is generated by designating "file1" and "folderB", which are included in the input information respectively as resources, respectively to keys "filename" and "folder" of the parameters in the process content 1204.

The mail component parameter 1922 is generated in accordance with the process content 1205 and the input information included in the process flow execution request. Said differently, the mail component parameter 1922 is generated by designating the resource "hogehoge@fuga.com" included in the input information to the key "to" of the parameter in the process content 1205.

The processed result 193 of the process of each component is stored in a case where the process of each component is executed.

Next, after the flow executing unit 131 receives the stored result, the flow executing unit 131 sends a component acquisition request to acquire the component to the component administering unit 132 in accordance with the process flow information 1200 (step S1104).

Said differently, the flow executing unit 131 sends the component acquisition request including the component name "delivery A component", which is designated in the process content 1204 in the detailed flow 1203 of the process flow information 1200, to the component administering unit 132.

After the component administering unit 132 receives the component acquisition request, the component administering unit 132 generates the delivery A component 1331 corresponding to the component name included in the component acquisition request (step S1105). The delivery component 1331 is generated by using the API for generating the component defined in the component common I/F 1330.

Then, the component administering unit 132 returns the generated delivery A component 1331 to the flow executing unit 131. Said differently, the component administering unit 132 returns the address in the memory (e.g., the RAM 14), on which the delivery A component 1331 is deployed, to the flow executing unit 131.

After the delivery A component 1331 is returned to the flow executing unit 131, the flow executing unit 131 sends a parameter acquisition request to acquire the parameter to be input into the component to the parameter evaluating unit 137 (step S1106). This parameter acquisition request includes the keys "filename" and "folder" of the parameter of the delivery A component 1331.

After the parameter evaluating unit 137 receives the parameter acquisition request for the parameter, the parameter evaluating unit 137 transfers the parameter acquisition request to the resource administering unit 136 (step S1107).

After the resource administering unit 136 receives the parameter acquisition request for the parameter, the resource administering unit 136 acquires a parameter corresponding to the key included in the parameter acquisition request from the delivery A component parameter 1921 of resource administration information 190D illustrated in FIG. 12A (step S1108).

Thus, the resource administering unit 136 acquires the parameter including "filename":"file1" and "folder": "folderB", which respectively correspond to the keys "filename" and "folder".

Then, the resource administering unit 136 returns the acquired parameter to the parameter evaluating unit 137.

The parameter evaluating unit 137 evaluates the returned parameter (step S1109). Said differently, the parameter evaluating unit 137 determines whether "filename":"file1" and "folder":"folderB", which are included in the returned parameter, have a replacement designation.

Here, "filename":"file1" and "folder":"folderB", which are included in the returned parameter, are not provided with the replacement designation. Therefore, the parameter evaluating unit 137 determines that the returned parameter is not provided with the replacement designation.

Then, the parameter evaluating unit 137 returns the parameter returned from the resource administering unit 136 to the flow executing unit 131 (step S1110). Said differently, the parameter evaluating unit 137 returns, for example, a parameter 4100 illustrated in FIG. 13A to the flow executing unit 131.

Next, the flow executing unit 131 sends the process execution request to execute the process to the delivery component 1331 (step S1111). This process execution request includes data and the parameter 4100 illustrated in FIG. 13A.

The data is the electronic file included in the process flow execution request received from the controlling unit 210 and having a data type of "InputStream". Said differently, the flow executing unit 131 transfers the electronic file, which is transferred as having the data type of "InputStream" from the controlling unit 210, simply as "data" (without convincing the data type) to the delivery A component 1331 and requests to execute the process. Within the first embodiment, this electronic file sent and received without convincing the data type is simply indicated as the "data".

After the delivery A component 1331 receives the process execution request, the delivery A component 1331 sends a type conversion request to the type conversion administering unit 134 (step S1112). Here, the type conversion request includes the data and a designation of "LocalFilePath" indicative of the data type, which can be treated by the delivery A component 1331.

After the type conversion administering unit 134 receives the type conversion request, the type conversion administering unit 134 checks whether the data type of the data included in the above type conversion request matches the designated data type (step S1113).

Here, the data type of the data included in the received type conversion request is "InputStream" and the designated data type is "LocalFilePath". Accordingly, the type conversion administering unit 134 determines that the data type of the data included in the received type conversion request does not match the designated data type.

Then, the type conversion administering unit 134 refers to the type-conversion information table 2000, and specifies the type conversion for converting "InputStream" to "LocalFilePath" (here, the first type conversion 1351 is specified). Then, the type conversion administering unit 134 generates the specified type conversion (step S1114).

The API defined in the type conversion common I/F 1350 is used to generate the first type conversion 1351.

Next, the type conversion administering unit 134 sends a type conversion request to the generated first type conversion 1351 (step S1115). This type conversion request includes data.

After the first type conversion 1351 receives the type conversion request, the first type conversion 1351 converts the data type of the data included in the type conversion request from "InputStream" to "LocalFilePath" (step S1116), the first type conversion 1351 returns the converted data to the type conversion administering unit 134. Thereafter, the type conversion administering unit 134 sends the data provided with the data conversion to the delivery A component 1331 (step S1117).

After the delivery A component 1331 receives the data provided with the type conversion, the delivery A component 1331 executes the process in accordance with the parameter 4100 (step S1118). Said differently, the delivery A component 1331 gives the file name "file1" to the electronic file indicated by the data and delivers (uploads) this electronic file to the folder having the folder name "folderB" of the external storage A.

The delivery A component 1331 can provide the file processing unit 1711 of the external-storage collaborating unit 1601 with the API "[external storage name/process/ folder" illustrated in FIG. 5A. Said differently, the delivery A component 1331 sends the data as, for example, "/storage-a/process/folder" to the file processing unit 1711.

With this, the electronic file (the electronic file generated by scanning) having the file name "file1" is stored in the folder having the folder name "folderB" of the external storage A.

Next, after the delivery A component 1331 completes the process execution, the delivery A component 1331 sends a processed result storage request to store the processed result to the resource administering unit 136 (step S1119). The processed result storage request includes the data indicative of the processed result obtained by the delivery A component 1331.

After the resource administering unit 136 receives the processed result storage request for the processed result, the resource administering unit 136 adds the processed result to the resource administration information 190D in accordance with the data included in the processed result storage request (step S1120). Then, the resource administering unit 136 returns the stored result to the delivery A component 1331.

Said differently, the resource administering unit 136 adds the processed result 1931 by the delivery A component 1331 to the processed result 193 of the resource administration information 190D as illustrated in FIG. 12B. The processed result 1931 includes "filename":"file1" indicative of the stored file name of the electronic file and "fileurl":"http://storageA.com/folderB/file1.txt" indicative of the storage destination URL.

As described, the processed result of the component is added to the resource administration information 190D at each process execution of the component. After the delivery A component 1331 receives the stored result from the resource administering unit 136, the delivery A component 1331 returns the data indicative of the processed result to the flow executing unit 131.

Next, after the flow executing unit 131 receives the data, the flow executing unit 131 sends a component acquisition request to acquire the component to the component administering unit 132 in accordance with the process flow information 1200 (step S1121).

Said differently, the flow executing unit 131 sends the component acquisition request to acquire the component including the component having a component name "mail component", which is designated in the process content 1205 in the detailed flow 1203 of the process flow information 1200, to the component administering unit 132.

After the component administering unit 132 receives the component acquisition request, the component administering unit 132 generates the mail component 1332 corresponding to the component name included in the component acquisition request (step S1122). The mail component 1332 is generated by using the API for generating the component defined in the component common I/F 1330.

Then, the component administering unit 132 returns the generated mail component 1332 to the flow executing unit 131. Said differently, the component administering unit 132 returns the address in the memory (e.g., the RAM 14), on which the mail component 1332 is deployed, to the flow executing unit 131.

After the mail component 1332 is returned to the flow executing unit 131, the flow executing unit 131 sends a parameter acquisition request to acquire the parameter to be input into the component to the parameter evaluating unit 137 (step S1123). The parameter acquisition request includes keys "from", "to", "cc", "bcc", "subject", and "body" of the parameters in the mail component 1332.

After the parameter evaluating unit 137 receives the parameter acquisition request for the parameter, the parameter evaluating unit 137 transfers the parameter acquisition request to the resource administering unit 136 (step S1124).

After the resource administering unit 136 receives the parameter acquisition request for the parameter, the resource administering unit 136 acquires the parameter corresponding to the key included in the parameter acquisition request from the mail component parameter 1922 of the resource administration information 190D (step S1125).

Said differently, the resource administering unit 136 acquires parameters including "from":"hoge@fuga.com", "to":"hogehoge@fuga.com", "cc":null, "bcc":null, "subject":"report of storage destination URL", "body":"${delivery A component.result.fileurl}", which respectively correspond to the keys "from", "to", "cc", "bcc", "subject", and "body", included in the parameter acquisition request.

Then, the resource administering unit 136 returns the acquired parameter to the parameter evaluating unit 137.

The parameter evaluating unit 137 evaluates the returned parameter (step S1126). Said differently, the parameter evaluating unit 137 determines whether the replacement designation is provided with "from":"hoge@fuga.com", "to":"hogehoge@fuga.com", "cc":null, "bcc":null, "subject":"report of storage destination URL", and "body":"${delivery A component.result.fileurl}", which are included in the returned parameter.

Here, the replacement designation is provided to "body":"${delivery A component.result.fileurl}" included in the returned parameter. Therefore, the parameter evaluating unit 137 determines that the returned parameter is provided with the replacement designation.

Then, the parameter evaluating unit 137 requests the resource administering unit 136 to send a resource acquisition request to acquire the resource (step S1127). The resource acquisition request includes the replacement designation "${delivery A component.result.fileurl}".

After the resource administering unit 136 receives the resource acquisition request, the resource administering unit 136 acquires the resource of the corresponding key in accordance with the replacement designation included in the resource acquisition request (step S1128). Then, the resource administering unit 136 returns the acquired resource to the parameter evaluating unit 137.

Said differently, the resource administering unit 136 acquires the resource "http://storageA.com/folderB/file1.txt" of the key "fileurl" from the processed result 1931 of the delivery A component 1331 in the resource administration information 190D illustrated in FIG. 12B based on "${delivery A component.result.fileurl}".

After the parameter evaluating unit 137 receives the resource from the resource administering unit 136, the parameter evaluating unit 137 replaces the resource provided with the replacement designation with the received resource (step S1129). Said differently, the parameter evaluating unit 137 replaces "body":"${delivery A component.result.fileurl}" with "body":"http://storageA.com/folderB/file1.txt".

Then, the parameter evaluating unit 137 returns the parameter including the resource provided with the replacement to the flow executing unit 131 (step S1130). Said differently, the parameter evaluating unit 137 returns, for example, a parameter 4200 illustrated in FIG. 13B to the flow executing unit 131.

As described, in a case where the key included in the parameter is provided with the replacement designation, the service providing system 10 of the first embodiment replaces the resource of this key with the designated resource. With this, the service providing system 10 of the first embodiment is enabled to use the processed result obtained by the other component.

Next, the flow executing unit 131 sends an process execution request to execute the process to the mail component 1332 (step S1131). This process execution request includes the data indicative of the processed result obtained by the delivery A component 1331 and the parameter 4200 illustrated in FIG. 13B.

After the mail component 1332 receives the process execution request, the mail component 1332 sends a type conversion request to the type conversion administering unit 134 (step S1132). Here, the type conversion request includes the data and a designation of "LocalFilePath" indicative of the data type, which can be handled by the mail component 1332.

After the type conversion administering unit 134 receives the type conversion request, the type conversion administering unit 134 checks whether the data type of the data included in the above type conversion request matches the designated data type (step S1133).

Here, the data type of the data included in the received type conversion request is "LocalFilePath" and the designated data type is also "LocalFilePath". Accordingly, the type conversion administering unit 134 determines that the data type of the data included in the type conversion request matches the designated data type.

Then, the type conversion administering unit 134 sends the data included in the type conversion request to the mail component 1332 (step S1134). As described, when the data types are determined to match in checking the data type (the process of step S1133), the type conversion administering unit 134 does not generate the type conversion.

After the mail component 1332 receives the data from the type conversion administering unit 134, the mail component 1135 executes the process (step S1135). Said differently, the mail component 1332 sends a mail having a subject "report of storage destination URL" and a body "http://storageA.com/folderB/file1.txt" to a destination "hogehoge@fuga.com".

The mail component 1332 sends a process request to sending of mail 151 of the document servicing unit 150, and the sending of mail 151 generates the above mail and sends the generated mail.

With this, the storage destination URL stored in the external storage A is sent to the designated address by the mail.

Next, after the mail component 1332 completes the process execution, the mail component 1332 sends a processed result storage request to store the processed result to the resource administering unit 136 (step S1136). The processed result storage request includes the data indicative of the processed result obtained by the mail component 1332.

After the resource administering unit 136 receives the processed result storage request for the processed result, the resource administering unit 136 adds the processed result to the resource administration information 190D in accordance with the data included in the processed result storage request (step S1136). Then, the resource administering unit 136 returns the stored result to the mail component 1332.

Said differently, the resource administering unit 136 adds the processed result 1932 by the mail component 1332 to the processed result 193 of the resource administration information 190D as illustrated in FIG. 12B. The processed result 1932 includes "from":"hoge@fuga.com" indicative of the sending source of the mail, "to":"hogehoge@fuga.com" indicative of the sending destination of the mail, "cc":null indicative of CC, and "bcc":null indicative of BCC. Further, the processed result 1932 includes "subject":"report of storage destination URL" indicative of the subject and "body": "http://storageA.com/folderB/file1.txt" indicative of the body.

As described, the processed result of the component is added to the resource administration information 190D at each process execution of the component. After the mail component 1332 receives the stored result from the resource administering unit 136, the mail component 1332 returns the data indicative of the processed result to the flow executing unit 131.

As described, the service providing system 10 of the first embodiment is enabled to replace the resource of the key with the resource included in the processed result of the other component in a case where the key included in the parameter input by the component is provided with the replacement designation. With this, in the service providing system 10 of the first embodiment, the processed result by the arbitrary component can be input by the other component as the parameter without depending on the key included in the parameter.

For example, in a case where an error occurs during the process execution by the delivery A component 1331 in the above step S1118, error information is added as the processed result by the delivery A component 1331 in step S1120. Said differently, in a case where an error occurs in the delivery A component 1331 due to, for example, an irregular input, a processed result 1933 indicative of the processed result (error information) obtained by the delivery A component 1331 is added to the resource administration information 190D as illustrated in FIG. 14.

Therefore, the processed result (the error information) by the arbitrary component can be input as the parameter into, for example, a component, to which the error information of the other component is input as the parameter, without depending on the keys as described above.

Second Embodiment

Next, the information processing system 1 of a second embodiment is described. The second embodiment differs from the first embodiment in that there is a template component for processing to add predetermined information to the processed result obtained by the other component. Within the second embodiment, the template component is used to enable to add an arbitrary phrase to the body of a mail in addition to the storage destination URL and to enable to send this mail to the designated destination. Hereinafter, portions having substantially the same functions as those of the first embodiment and portions performing the same processes as those of the first embodiment are designated by the same reference symbols as those of the first embodiment, and description of these portions is omitted.

<Functional Structure>

Next, referring to FIG. 15, a detailed functional structure of the logic processing unit 130 of the second embodiment is described. FIG. 15 is a diagram illustrating the functional structure of an exemplary logic processing unit 130 of the second embodiment.

The logic processing unit 130 of the second embodiment differs from the logic processing unit 130 of the first embodiment at a point that the template component 1333 is included in the component group 133.

The template component 1333 processes the processed result obtained by the other component in accordance with the template information designated in the process flow information 1200.

<Detailed Process>

Referring to FIG. 16, described below is a process flow execution process of the second embodiment. FIG. 16 is a sequence chart of an exemplary process flow execution process to execute the process flow of the second embodiment.

After the flow executing unit 131 receives a process flow execution request to execute the process flow, the flow executing unit 131 sends a process flow information acquisition request to acquire the process flow information to the app administering unit 120 (step S1601). Within the second embodiment, the process flow information acquisition request includes an app ID "app001" and a flowID "flow002".

The app administering unit 120 acquires the process flow information 1200 corresponding to the app ID "app001" and the flow ID "flow001", which are included in the received process flow information acquisition request, from the app information memory unit 180 and returns the process flow information 1200.

Within the second embodiment, the process flow information 1200 illustrated in FIG. 17 is returned to the flow executing unit 131.

The process flow information 1200 illustrated in FIG. 17 is an example of the process flow information 1200 included in the app information 1000 of the app ID "app001".

The process flow information 1200 illustrated in FIG. 17 includes a flow ID 1211, a flow name 1212, and a detailed flow 1213.

Further, the detailed flow 1213 includes a process content 1214 indicative of a delivery process of storing the electronic file into the external storage A, a process content 1215 indicative of an addition process of adding predetermined information to the processed result obtained by the delivery A component, and a process content 1216 indicative of a mail process of sending the storage destination URL using a mail.

In the process content 1214, the name "delivery A component" of the component of executing the delivery process and the parameter input into the component are designated.

In the process content 1215, the name "template component" of the component executing the addition process, the parameter to be input into the component, and the template information indicative of the content to be added to the processed result are designated.

Here, the template information is designated such that "The file is stored into the external storage A. The storage destination URL is ${delivery component.result.fileurl}." As described, the template information is designated by embedding the replacement designation in an arbitrary text or the like.

In the process content 1216, the name "mail component" of the component of executing the mail process and a parameter input into the component are designated.

Next, after the flow executing unit 131 receives the process flow information 1200, the flow executing unit 131 sends a resource administration information storage request to store the resource administration information to the resource administering unit 136 (step S1602). The resource administration information storage request includes the process flow storage request received from the UI controlling unit 210 and the process contents 1214, 1215, and 1216, which are included in the process flow information 1200.

After the resource administering unit 136 receives the resource administration information storage request to store the resource administration information, the resource administering unit 136 generates, for example, resource administration information 190D illustrated in FIG. 18A in accordance with the process flow execution request included in the resource administration information storage request and the process contents S1214, S1215, and S1216. The resource administering unit 136 stores the generated resource administration information 190D in the resource administration information memory unit 190 (step S1603) and returns the stored result to the flow executing unit 131.

The resource administration information 190D illustrated in FIG. 18A includes an execution request 194, a parameter 195, and a processed result 196.

The execution request 194 is the process flow execution request included in the resource administration information storage request for the resource administration information. The processed result 196 of the process of each component is stored in a case where the process of each component is executed.

The parameter 195 includes a delivery A component parameter 1951, a template component parameter 1952, and a mail component parameter 1953.

The delivery A component parameter 1951 is generated in accordance with the process content 1214 and the input information included in the process flow execution request. The mail component parameter 1953 is generated in accordance with the process content 1216 and the input information included in the process flow execution request.

The template component parameter 1952 is generated in accordance with the process content 1215. Said differently, the template component parameter 1952 is generated without designating the key and the resource in a manner similar to the parameter in the process content 1215.

Because the process of step S1604 is similar to the processes of steps S1104 to S1120 of FIG. 11, explanation is omitted. The processed result of the delivery A component 1331 is added to the resource administration information 190D. As illustrated in FIG. 18B, a processed result 1961 of the delivery A component 1331 is added to the processed result 196 of the resource administration information 190D as illustrated in FIG. 18B.

Next, after the flow executing unit 131 receives the data from the delivery A component 1331, the flow executing unit 131 sends a component acquisition request to acquire the component to the component administering unit 132 in accordance with the process flow information 1200 (step S1605).

Said differently, the flow executing unit 131 sends the component acquisition request to acquire the component including the component having the component name "template component", which is designated in the process content 1215 in the detailed flow 1213 of the process flow information 1200 illustrated in FIG. 17, to the component administering unit 132.

After the component administering unit 132 receives the component acquisition request, the component administering unit 132 generates the template component 1333 corresponding to the component name included in the component acquisition request (step S1606). The template component 1333 is generated by using the API for generating the component defined in the component common I/F 1330.

Then, the component administering unit 132 returns the generated template component 1333 to the flow executing unit 131. Said differently, the component administering unit 132 returns the address in the memory (e.g., the RAM 14), on which the template component 1333 is deployed, to the flow executing unit 131.

After the template component 1333 is returned to the flow executing unit 131, the flow executing unit 131 sends a parameter acquisition request to acquire the parameter to be input into the component to the parameter evaluating unit 137 (step S1607). Because the key and the resource are not included in the parameter input in the template component 1333, the parameter acquisition request does not include the key.

After the parameter evaluating unit 137 receives the parameter acquisition request for the parameter, the parameter evaluating unit 137 transfers the parameter acquisition request to the resource administering unit 136 (step S1608). Then, the resource administering unit 136 returns a null parameter without the key and the resource to the parameter evaluating unit 137.

The parameter evaluating unit 137 evaluates the returned parameter (step S1609). Because the returned parameter does not include the key and the resource, the parameter evaluating unit 137 determines that the returned parameter is not provided with the replacement designation.

Then, the parameter evaluating unit 137 returns the parameter returned from the resource administering unit 136 to the flow executing unit 131 (step S1610). Said differently, the parameter evaluating unit 137 returns, for example, a parameter 4300 illustrated in FIG. 19A to the flow executing unit 131.

Next, the flow executing unit 131 sends an process execution request to execute the process to the template component 1333 (step S1611). The process execution request includes the data, the parameter 4300 illustrated in FIG. 19A, and the template information designated in the process content 1215 of the process flow information 1200 illustrated in FIG. 17.

After the template component 1333 receives the process execution request, the template component 1333 sends a type conversion request to the type conversion administering unit 134 (step S1612). Here, the type conversion request includes the data and a designation of "LocalFilePath" indicative of the data type, which can be handled by the template component 1333.

After the type conversion administering unit 134 receives the type conversion request, the type conversion administering unit 134 checks whether the data type of the data included in the above type conversion request matches the designated data type (step S1613).

Here, the data type of the data included in the received type conversion request is "LocalFilePath" and the designated data type is also "LocalFilePath". Accordingly, the type conversion administering unit 134 determines that the data type of the data included in the type conversion request matches the designated data type.

Then, the type conversion administering unit 134 sends the data included in the type conversion request to the template component 1333 (step S1614). As described, when the data types are determined to match in checking the data type (the process of step S1613), the type conversion administering unit 134 does not generate the type conversion.

After the template component 1333 receives the data from the type conversion administering unit 134, the template component 1333 sends a resource acquisition request to acquire the resource to the resource administering unit 136 (step S1615). The resource acquisition request includes a replacement designation designated in the template information. Said differently, the resource acquisition request includes the replacement designation "${delivery A component.result.fileurl}".

After the resource administering unit 136 receives the resource acquisition request, the resource administering unit 136 acquires the resource of the corresponding key in accordance with the replacement designation included in the resource acquisition request (step S1616). Then, the resource administering unit 136 returns the acquired resource to the template component 1333.

Said differently, the resource administering unit 136 acquires the resource "http://storageA.com/folderB/file1.txt" of the key "fileurl" from the processed result 1961 of the delivery A component 1331 in the resource administration information 190D illustrated in FIG. 18B based on "${delivery A component.result.fileurl}".

After the template component 1333 receives the resource from the resource administering unit 136, the template component 1333 replaces the replacement designation designated in the template information with the received resource (step S1617).

Said differently, the template component 1333 replaces template information "The file is stored into the external storage A. The storage destination URL is delivery A component.result.fileurl" with "The file is stored into the external storage A. The storage destination URL is http://storageA.com/folderB/file1.txt".

Next, after the template component 1333 sends a processed result storage request to store the processed result to the resource administering unit 136 (step S1618). The processed result storage request includes data indicative of the replaced template information, which is the processed result obtained by the template component 1333.

After the resource administering unit 136 receives the processed result storage request for the processed result, the resource administering unit 136 adds the processed result to the resource administration information 190D in accordance with the data included in the processed result storage request (step S1619). Then, the resource administering unit 136 returns the stored result to the template component 1333.

Said differently, the resource administering unit 136 adds the processed result 1962 obtained by the template component 1333 to the processed result 196 of the resource administration information 190D as illustrated in FIG. 18B. The processed result 1962 includes "template":"The file is stored into the external storage A. The storage destination URL is http://storageA.com/folderB/file1.txt" indicating the replaced template information. After the template component 1333 receives the stored result from the resource administering unit 136, the template component 1333 returns data indicative of the processed result to the flow executing unit 131.

As described above, the template component 1333 uses the template information, in which the replacement designation is embedded, to process the processed result of the other component by adding an arbitrary character, symbol, number, and so on.

Next, after the flow executing unit 131 receives the data, the flow executing unit 131 sends a component acquisition request to acquire the component to the component administering unit 132 in accordance with the process flow information 1200 (step S1620).

Said differently, the flow executing unit 131 sends the component acquisition request to acquire the component including the component having a component name "mail component", which is designated in the process content 1216 in the detailed flow 1213 of the process flow information 1213, to the component administering unit 132.

After the component administering unit 132 receives the component acquisition request, the component administering unit 132 generates the mail component 1332 corresponding to the component name included in the component acquisition request (step S1621). The mail component 1332 is generated by using the API for generating the component defined in the component common I/F 1330.

Then, the component administering unit 132 returns the generated mail component 1332 to the flow executing unit 131. Said differently, the component administering unit 132 returns the address in the memory (e.g., the RAM 14), on which the mail component 1332 is deployed, to the flow executing unit 131.

After the mail component 1332 is returned to the flow executing unit 131, the flow executing unit 131 sends a parameter acquisition request to acquire the parameter to be input into the component to the parameter evaluating unit 137 (step S1622). The parameter acquisition request includes keys "from", "to", "cc", "bcc", "subject", and "body" of the parameters in the mail component 1332.

After the parameter evaluating unit 137 receives the parameter acquisition request for the parameter, the parameter evaluating unit 137 transfers the parameter acquisition request to the resource administering unit 136 (step S1623).

After the resource administering unit 136 receives the parameter acquisition request for the parameter, the resource administering unit 136 acquires the parameter corresponding to the key included in the parameter acquisition request from the mail component parameter 1953 of the resource administration information 190D (step S1624).

Said differently, the resource administering unit 136 acquires parameters including "from":"hoge@fuga.com", "to":"hogehoge@fuga.com", "cc":null, "bcc":null, "subject":"report of storage destination URL", and "body": "${template component.result.fileurl}", which respectively correspond to the keys "from", "to", "cc", "bcc", "subject", and "body", included in the parameter acquisition request.

Then, the resource administering unit 136 returns the acquired parameter to the parameter evaluating unit 137.

The parameter evaluating unit 137 evaluates the returned parameter (step S1625). Said differently, the parameter evaluating unit 137 determines whether the replacement designation is provided with "from":"hoge@fuga.com", "to":"hogehoge@fuga.com", "cc":null, "bcc":null, "subject":"report of storage destination URL", and "body": "${template component.result.template}", which are included in the returned parameter.

Here, the replacement designation is provided to "body": "${template component.result.template}" included in the returned parameter. Therefore, the parameter evaluating unit 137 determines that the returned parameter is provided with the replacement designation.

Then, the parameter evaluating unit 137 requests the resource administering unit 136 to send a resource acquisition request to acquire the resource (step S1626). The resource acquisition request includes the replacement designation "${template component.result.template}".

After the resource administering unit 136 receives the resource acquisition request, the resource administering unit 136 acquires the resource of the corresponding key in accordance with the replacement designation included in the resource acquisition request (step S1627). Then, the resource administering unit 136 returns the acquired resource to the parameter evaluating unit 137.

Said differently, the resource administering unit 136 acquires the resource of the key "template" from the processed result 1962 obtained by the template component 1333 with the resource administration information 190D illustrated in FIG. 18B in accordance with the replacement designation included in the resource acquisition request. Therefore, the resource administering unit 136 acquires the resource "The file is stored into the external storage A. The storage destination URL is http://storageA.com/folderB/file1.txt." and returns this resource to the parameter evaluating unit 137.

After the parameter evaluating unit 137 receives the resource from the resource administering unit 136, the parameter evaluating unit 137 replaces the resource provided with the replacement designation with the received resource (step S1628).

Said differently, the parameter evaluating unit 137 replaces "body":"${template component.result.template}" with "body":"The file is stored into the external storage A. The storage destination URL is http://storageA.com/folderB/file1.txt".

Then, the parameter evaluating unit 137 returns the parameter including the resource provided with the replacement to the flow executing unit 131 (step S1629). Said differently, the parameter evaluating unit 137 returns, for example, a parameter 4400 illustrated in FIG. 19B to the flow executing unit 131.

Next, the flow executing unit 131 sends a process execution request to execute the process to the mail component 1332 (step S1630). This process execution request includes data indicative of the processed result obtained by the template component 1333 and the parameter 4400 illustrated in FIG. 19B.

Because the subsequent processes of steps S1132 to S1134 are similar to FIG. 11, description of these subsequent processes is omitted.

After the mail component 1332 receives the data from the type conversion administering unit 134, the mail component 1332 executes the process (step S1631). Said differently, the template component 1333 replaces template information "The file is stored into the external storage A. The storage destination URL is ${delivery A component.result.fileurl}" with "The file is stored into the external storage A. The storage destination URL is "http://storageA.com/folderB/file1.txt".

The mail component 1332 sends a process request to the sending of mail 151 of the document servicing unit 150, and the sending of mail 151 generates the above mail and sends the generated mail.

With this, the storage destination URL stored in the external storage A is sent to the designated address by the mail. Further, in the service providing system 10 of the second embodiment, an arbitrary character or the like is added to the storage destination URL and the mail, to which the arbitrary character is added, can be sent.

Next, after the mail component 1332 completes the process execution, the mail component 1332 sends a processed result storage request to store the processed result to the resource administering unit 136 (step S1632). The processed result storage request includes data indicative of the processed result obtained by the mail component 1332.

After the resource administering unit 136 receives a processed result storage request to store the processed result, the resource administering unit 136 adds the processed result to the resource administration information 190D in accordance with the data included in the processed result storage request (step S1633). Then, the resource administering unit 136 returns the stored result to the mail component 1332.

Said differently, the resource administering unit 136 adds the processed result 1963 obtained by the mail component 1332 to the processed result 196 of the resource administration information 190D as illustrated in FIG. 18B. The processed result 1963 includes "from":"hoge@fuga.com" indicative of the sending source of the mail, "to": "hogehoge@fuga.com" indicative of the sending destination of the mail, "cc":null indicative of CC, and "bcc":null indicative of BCC. Further, the processed result 1932 includes "subject":"report of storage destination URL" indicative of the subject and "body":"The file is stored into the external storage A. The storage destination URL is http://storageA.com/folderB/file1.txt" indicative of the body. After the mail component 1332 receives the stored result from the resource administering unit 136, the mail component 1332 returns the data indicative of the processed result to the flow executing unit 131.

As described above, in the service providing system 10 of the second embodiment, after providing a predetermined process to the processed result obtained by an arbitrary component, the other component can input into the processed result to form a parameter.

According to the embodiment of the present invention, a sequence of processes formed by combining components can be executed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the su-periority or inferiority of the invention. Although the information processing system has been described in detail, it should be understood that various changes, sub-stitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

REFERENCE SIGNS LIST 1 information processing system
10 service providing system
20 apparatus
30 external storage system
110 service processing unit
120 app administering unit
130 logic processing unit
131 flow executing unit
132 component administering unit
133 component group
134 type conversion administering unit
135 type conversion group
136 resource administering unit
137 parameter evaluating unit
140 data I/F unit
150 document servicing unit
160 external-storage collaborating unit
180 app information memory unit
190 resource administration information memory unit
210 UI controlling unit
220 scan processing unit
1000 app information
1100 screen definition information
1200 process flow information
2000 type-conversion information table This application is claiming the benefit of priorities of Japanese Patent Application No. 2015-214039 filed on Oct. 30, 2015 and Japanese Patent Application No. 2016-147245 filed on Jul. 27, 2016, where the entire contents of all applications which are incorporated herein by reference.

The invention claimed is:
1. An information processing system comprising:
at least one information processing apparatus that includes
a processor; and
a memory storing a plurality of programs that respectively cause the processor to
store in the memory, for each application executing a sequence of processes using electronic data:
program identification information that identifies at least one program from among the plurality of programs executing the sequence of processes for an external service,
a parameter used to execute the at least one program from among the plurality of programs, the parameter including a data item that indicates whether the data item is to be replaced with a data value that identifies an external storage destination, and flow information defining an execution order of the at least one program from among the plurality of programs while associating app identification information that identifies the application with the program identification information, the parameter, and the flow information;

acquire, upon receiving information related to the electronic data and a request including the app identification information from an apparatus coupled to the information processing system, the flow information stored in the memory in association with the app identification information included in the request;

execute the at least one program identified by the program identification information defined in the acquired flow information using the parameter defined in the flow information, and in accordance with the execution order defined in the flow information to execute the sequence of processes using the electronic data in accordance with the information related to the electronic data included in the request; and replace the data value of the data item included in the parameter used to execute the at least one program from among the plurality of programs in a case where the data item indicates that the data item is to be replaced with the data value identifying the external storage destination, wherein the at least one program includes a template program that sends a resource acquisition request in which predetermined information is added to a processed result of another program, and the template program embeds the processed result into a predetermined position in predetermined template information.

2. The information processing system according to claim 1, wherein the another data value is a processed result of another program from among the at least one program.

3. The information processing system according to claim 1, wherein the at least one program includes a first program of executing a process for the external service, and the first program includes a second program of executing a process of uploading the electronic data to the external service.

4. The information processing system according to claim 1, wherein the program instructions further causes the at least one processor to:

convert a data type of the electronic data to a predetermined data type, execute the at least one program after converting the data type of the electronic data into a data type processable by the at least one program, and thereafter execute the at least one program to execute the sequence of processes using the electronic data, wherein the at least one program includes a template program that sends a resource acquisition request in which predetermined information is added to a processed result of another program, and the template program embeds the processed result into a predetermined position in predetermined template information.

5. The information processing system according to claim 1, wherein the predetermined information added to the processed result of the another program includes an arbitrary phrase that communicates the external storage destination in natural language.

6. An information processing apparatus, comprising:

a processor; and a memory storing a plurality of programs that respectively cause the processor to store in the memory, for each application executing a sequence of processes using electronic data:

program identification information at least one program from among the plurality of programs executing the sequence of processes for an external service, a parameter used to execute the at least one program from among the plurality of programs, the parameter including a data item that indicates whether the data item is to be replaced with a data value that identifies an external storage destination, and flow information defining an execution order of the at least one program while associating app identification information that identifies the application with the program identification information, the parameter, and the flow information;

acquire, upon receiving information related to the electronic data and a request including the app identification information from an apparatus coupled to the information processing apparatus, the flow information stored in the memory in association with the app identification information included in the request;

execute the at least one program identified by the program identification information defined in the acquired flow information using the parameter defined in the flow information, and in accordance with the execution order defined in the flow information to execute the sequence of processes using the electronic data in accordance with the information related to the electronic data included in the request; and replace the data value of the data item included in the parameter used to execute the at least one program in a case where the data item indicates that the data item is to be replaced with the data value identifying the external storage destination, wherein the at least one program includes a template program that sends a resource acquisition request in which predetermined information is added to a processed result of another program, and the template program embeds the processed result into a predetermined position in predetermined template information.

7. The information processing apparatus according to claim 6, wherein the predetermined information added to the processed result of the another program includes an arbitrary phrase that communicates the external storage destination in natural language.

8. A method for processing information used in an information processing apparatus that includes a processor, and a memory storing a plurality of programs that respectively cause the processor to execute the method, the method comprising:

storing in the memory, for each application executing a sequence of processes using electronic data:

program identification information that identifies at least on program from among the plurality of programs executing the sequence of processes for an external service, a parameter used to execute the at least one program from among the plurality of programs, the parameter including a data item that indicates whether the data item is to be replaced with a data value that identifies an external storage destination, and flow information defining an execution order of the at least one program while associating app identification information that identifies the application with the program identification information, the parameter, and the flow information;

acquiring, upon receiving information related to the electronic data and a request including the app identification information from an apparatus coupled to the information processing apparatus, the flow information stored in the memory in association with the app identification information included in the request;

executing the at least one program identified by the program identification information defined in the acquired flow information using the parameter defined in the flow information, and in accordance with the execution order defined in the flow information to execute the sequence of processes using the electronic data in accordance with the information related to the electronic data included in the request; and replacing the data value of the data item included in the parameter used to execute the at least one program in a case where the data item indicates that the data item is to be replaced with the data value identifying the external storage destination, wherein the at least one program includes a template program that sends a resource acquisition request in which predetermined information is added to a processed result of another program, and the template program embeds the processed result into a predetermined position in predetermined template information.

9. The method according to claim 8, wherein the predetermined information added to the processed result of the another program includes an arbitrary phrase that communicates the external storage destination in natural language.

* * * * *